US011961130B2

(12) United States Patent
Locke et al.

(10) Patent No.: US 11,961,130 B2
(45) Date of Patent: Apr. 16, 2024

(54) SYSTEM FOR SALE-RESTRICTED ITEMS MANAGEMENT

(71) Applicant: Walmart Apollo, LLC, Bentonville, AR (US)

(72) Inventors: Nicholas Locke, Rogers, AR (US); Douglas E. Humphrys, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 86 days.

(21) Appl. No.: 17/715,195

(22) Filed: Apr. 7, 2022

(65) Prior Publication Data
US 2022/0230215 A1   Jul. 21, 2022

Related U.S. Application Data

(63) Continuation of application No. 16/914,915, filed on Jun. 29, 2020, now abandoned.
(Continued)

(51) Int. Cl.
*G06Q 20/40* (2012.01)
*G06F 3/0482* (2013.01)
(Continued)

(52) U.S. Cl.
CPC ....... *G06Q 30/0607* (2013.01); *G06F 3/0482* (2013.01); *G06F 3/04847* (2013.01);
(Continued)

(58) Field of Classification Search
CPC .. G06Q 30/0607; G06Q 20/18; G06Q 20/203; G06Q 20/4014; G06F 3/0482; G07F 9/026
See application file for complete search history.

(56) References Cited

U.S. PATENT DOCUMENTS 5,215,213 A * 6/1993 Nestler ............... B65G 1/1378
                                                  221/129
5,979,757 A   11/1999 Tracy et al.
(Continued)

FOREIGN PATENT DOCUMENTS

CN        105184976 A  * 12/2015
JP        2014154162 A *  8/2014   ......... G06F 16/2291
(Continued)

OTHER PUBLICATIONS

Young, Lee, "International Search Report", International Application No. PCT/US2020/040092, dated Sep. 28, 2020, 2 pages.
(Continued)

*Primary Examiner* — Ashford S Hayles
(74) *Attorney, Agent, or Firm* — Foley IP Law, PLLC

(57) ABSTRACT

Examples provides sale-restricted items management for self-checkout. A list of sale-restricted items is displayed via a graphical user interface (GUI) provided by a user interface. A notification component transmits a notification to a user device associated with an authorized user to verify a transaction responsive to an unauthorized user selection of a sale-restricted item from the list of sale-restricted items displayed. The notification includes an identification of the selected sale-restricted item and location of the selected sale-restricted item. A verification component authorizes completion of the transaction associated with the selected sale-restricted item by the unauthorized user on condition an age verification is obtained from the user device associated with the authorized user. Responsive to the authorization, an unlocking signal is sent to a locking storage device storing the selected sale-restricted item.

20 Claims, 19 Drawing Sheets

Related U.S. Application Data

(60) Provisional application No. 62/873,938, filed on Jul. 14, 2019.

(51) Int. Cl.
*G06F 3/04847* (2022.01)
*G06K 7/10* (2006.01)
*G06K 7/14* (2006.01)
*G06Q 10/0875* (2023.01)
*G06Q 20/18* (2012.01)
*G06Q 20/20* (2012.01)
*G06Q 30/018* (2023.01)
*G06Q 30/0601* (2023.01)
*G06Q 50/26* (2012.01)

(52) U.S. Cl.
CPC ..... *G06K 7/10297* (2013.01); *G06K 7/10366* (2013.01); *G06K 7/1413* (2013.01); *G06K 7/1417* (2013.01); *G06Q 10/0875* (2013.01); *G06Q 20/18* (2013.01); *G06Q 20/203* (2013.01); *G06Q 20/206* (2013.01); *G06Q 20/208* (2013.01); *G06Q 20/4014* (2013.01); *G06Q 30/0185* (2013.01); *G06Q 30/0633* (2013.01); *G06Q 30/0639* (2013.01); *G06Q 30/0641* (2013.01); *G06Q 50/265* (2013.01)

(56) References Cited

U.S. PATENT DOCUMENTS

| | | | | |
|---|---|---|---|---|
| 5,993,046 | A * | 11/1999 | McGrady | G06M 7/04 700/231 |
| 6,439,345 | B1 * | 8/2002 | Recktenwald | A47F 9/046 235/383 |
| 6,571,218 | B1 * | 5/2003 | Sadler | G06Q 20/20 705/16 |
| 6,711,465 | B2 * | 3/2004 | Tomassi | G07C 9/257 700/236 |
| 7,191,941 | B1 * | 3/2007 | Mollett | G06Q 30/04 235/383 |
| 7,422,148 | B2 * | 9/2008 | Barton | G07G 1/0045 235/383 |
| 7,477,149 | B2 * | 1/2009 | Kangas | G08B 13/248 340/568.1 |
| 7,558,742 | B2 * | 7/2009 | Kloubakov | G06Q 20/20 705/16 |
| 7,783,379 | B2 * | 8/2010 | Beane | G06Q 20/40145 700/244 |
| 8,010,411 | B2 | 8/2011 | Woodward et al. | |
| 8,355,992 | B1 * | 1/2013 | Haugh | G06Q 20/20 705/64 |
| 8,473,351 | B1 * | 6/2013 | Mollett | G06Q 20/20 705/16 |
| 9,230,076 | B2 | 1/2016 | King et al. | |
| 10,032,326 | B1 * | 7/2018 | Landers, Jr. | G06V 20/52 |
| 10,185,921 | B1 * | 1/2019 | Heller | G07C 9/38 |
| 10,614,413 | B2 * | 4/2020 | Curry | G07C 9/00182 |
| 10,664,801 | B1 * | 5/2020 | Rosenfeld | G06Q 10/0875 |
| 11,620,866 | B1 * | 4/2023 | Goetz | G07C 9/00912 705/44 |
| 2002/0087413 | A1 * | 7/2002 | Mahaffy | G10L 13/00 705/16 |
| 2002/0148896 | A1 * | 10/2002 | Persky | G07G 1/01 235/383 |
| 2003/0009384 | A1 * | 1/2003 | Sadler | G07G 1/12 705/23 |
| 2003/0177102 | A1 * | 9/2003 | Robinson | G06Q 20/401 705/75 |
| 2004/0133477 | A1 * | 7/2004 | Morris | G06Q 30/0603 348/E7.086 |
| 2004/0143445 | A1 * | 7/2004 | Sheem | G07F 9/026 705/16 |
| 2005/0086159 | A1 | 4/2005 | Laiwalla et al. | |
| 2005/0137987 | A1 * | 6/2005 | May | G07F 9/026 705/75 |
| 2005/0178831 | A1 * | 8/2005 | Sherrod | G07F 11/24 235/381 |
| 2005/0269347 | A1 * | 12/2005 | Templer | G07F 11/62 221/232 |
| 2005/0283402 | A1 * | 12/2005 | Mason | A47F 9/046 705/16 |
| 2006/0016885 | A1 * | 1/2006 | Roberts | G08B 13/2402 235/382 |
| 2006/0043112 | A1 * | 3/2006 | Gilmore | G07F 7/00 222/130 |
| 2006/0157560 | A1 * | 7/2006 | Skor | G07F 9/002 235/381 |
| 2006/0266823 | A1 * | 11/2006 | Passen | G07F 9/026 235/381 |
| 2007/0124170 | A1 * | 5/2007 | Cabell | G06Q 20/20 705/18 |
| 2007/0168290 | A1 * | 7/2007 | Robinson | G06Q 20/401 705/51 |
| 2007/0174130 | A1 * | 7/2007 | Seeley | G06Q 50/30 705/26.35 |
| 2007/0284442 | A1 * | 12/2007 | Herskovitz | G07F 17/0092 235/383 |
| 2008/0073430 | A1 * | 3/2008 | Sickenius | G06Q 20/204 235/383 |
| 2008/0269947 | A1 * | 10/2008 | Beane | G06Q 20/12 700/241 |
| 2009/0076832 | A1 * | 3/2009 | Collins | G06Q 10/00 705/1.1 |
| 2009/0157515 | A1 * | 6/2009 | Lafauci | G06Q 20/20 705/16 |
| 2009/0192837 | A1 * | 7/2009 | Templer | G07F 9/002 700/242 |
| 2009/0210240 | A1 * | 8/2009 | Benschop | G06Q 20/40145 705/317 |
| 2009/0212065 | A1 * | 8/2009 | Templer | G07F 9/026 221/133 |
| 2009/0230187 | A1 * | 9/2009 | Benschop | G07F 9/026 235/382 |
| 2009/0321515 | A1 * | 12/2009 | Turner | G07F 9/026 235/381 |
| 2010/0042437 | A1 * | 2/2010 | Levy | G16H 40/67 700/242 |
| 2010/0234987 | A1 * | 9/2010 | Benschop | G07F 7/025 340/5.81 |
| 2010/0249994 | A1 * | 9/2010 | Sinclair | G07F 9/0235 235/383 |
| 2011/0106653 | A1 * | 5/2011 | Wein | G06Q 30/0633 345/173 |
| 2011/0145147 | A1 * | 6/2011 | Wylie | G06Q 20/40 707/812 |
| 2011/0208349 | A1 * | 8/2011 | Concannon | G07F 9/026 700/232 |
| 2012/0004769 | A1 * | 1/2012 | Hallenbeck | G07F 11/62 700/232 |
| 2012/0095882 | A1 * | 4/2012 | Wolff | G06Q 30/0238 705/27.2 |
| 2012/0109372 | A1 * | 5/2012 | Edwards | G06Q 10/06 700/241 |
| 2012/0197741 | A1 * | 8/2012 | Carlegren | G07G 1/0036 705/16 |
| 2012/0253508 | A1 * | 10/2012 | Holmes | A47F 1/128 700/232 |
| 2012/0261468 | A1 * | 10/2012 | Hecht | G07F 9/026 235/380 |
| 2012/0310410 | A1 * | 12/2012 | Adams | G07F 5/18 700/237 |
| 2012/0310716 | A1 * | 12/2012 | Jankowski | G06Q 30/06 348/E7.083 |
| 2012/0323621 | A1 * | 12/2012 | Carlegren | G06Q 30/00 705/16 |
| 2012/0323729 | A1 * | 12/2012 | Kline | G06Q 10/0833 705/26.8 |

(56) References Cited

U.S. PATENT DOCUMENTS

| | | | | |
|---|---|---|---|---|
| 2013/0204750 | A1* | 8/2013 | Nordman | G06Q 20/203 705/28 |
| 2014/0043162 | A1* | 2/2014 | Siciliano | G07F 9/026 340/568.8 |
| 2014/0222630 | A1* | 8/2014 | McCauley | G06Q 20/322 705/28 |
| 2015/0088675 | A1* | 3/2015 | Varrasso | G07F 9/002 705/18 |
| 2015/0134346 | A1* | 5/2015 | Hyde | G06Q 10/10 705/2 |
| 2015/0356664 | A1* | 12/2015 | Mackler | G06Q 30/0635 705/26.81 |
| 2016/0034872 | A1* | 2/2016 | Hendrick | G07G 1/0009 705/16 |
| 2016/0042620 | A1* | 2/2016 | Dandie | G06Q 50/32 340/568.3 |
| 2016/0104140 | A1* | 4/2016 | Harrow | G06Q 20/322 705/42 |
| 2016/0140526 | A1* | 5/2016 | Cummins | G06Q 10/087 705/28 |
| 2016/0155127 | A1* | 6/2016 | Hartman | H04N 5/772 705/18 |
| 2016/0196485 | A1* | 7/2016 | Patterson | G06K 19/0723 340/572.1 |
| 2016/0217421 | A1* | 7/2016 | Giera | G06Q 10/103 |
| 2016/0247135 | A1* | 8/2016 | Miller | G06Q 20/20 |
| 2016/0257493 | A1* | 9/2016 | Astigarraga | B65C 3/26 |
| 2016/0267561 | A1* | 9/2016 | Atikoglu | G06F 21/32 |
| 2016/0275284 | A1* | 9/2016 | Powell | G06F 21/36 |
| 2016/0275324 | A1* | 9/2016 | Powell | G06K 7/1413 |
| 2016/0314431 | A1* | 10/2016 | Quezada | G06Q 10/087 |
| 2017/0076066 | A1 | 3/2017 | Adams et al. | |
| 2017/0091744 | A1* | 3/2017 | Chakrobartty | G06Q 30/0238 |
| 2017/0103185 | A1 | 4/2017 | Adams et al. | |
| 2017/0132682 | A1* | 5/2017 | Jones | G06Q 30/0613 |
| 2017/0140600 | A1* | 5/2017 | Halsey, Jr. | G06K 19/077 |
| 2017/0185984 | A1* | 6/2017 | Leggo | G06Q 20/204 |
| 2017/0186059 | A1* | 6/2017 | Ogawa | G06Q 20/42 |
| 2017/0186285 | A1* | 6/2017 | Kakino | G07G 1/0072 |
| 2017/0200208 | A1* | 7/2017 | Kondo | G06Q 30/06 |
| 2017/0221060 | A1* | 8/2017 | Boyd | G07F 9/026 |
| 2017/0228805 | A1* | 8/2017 | Atikoglu | G06Q 20/40145 |
| 2017/0286940 | A1* | 10/2017 | Clark | G06Q 20/20 |
| 2017/0345010 | A1* | 11/2017 | Hagihara | G06Q 30/0607 |
| 2018/0018659 | A1* | 1/2018 | Bolton | G06Q 20/3821 |
| 2018/0075502 | A1* | 3/2018 | Dika | G06F 16/90335 |
| 2018/0174216 | A1* | 6/2018 | Smith | G06Q 50/265 |
| 2018/0276602 | A1* | 9/2018 | Rivalto | G06Q 20/308 |
| 2018/0276729 | A1* | 9/2018 | Durzy | G06F 16/24552 |
| 2018/0293831 | A1* | 10/2018 | Takeuchi | G06Q 20/322 |
| 2019/0050921 | A1* | 2/2019 | Ryner | G06Q 20/18 |
| 2019/0114685 | A1* | 4/2019 | Postrel | G06Q 30/0607 |
| 2019/0172291 | A1* | 6/2019 | Naseath | G07C 9/00912 |
| 2019/0197544 | A1* | 6/2019 | Frost | G07F 9/023 |
| 2019/0206174 | A1* | 7/2019 | Miu | G07F 9/026 |
| 2019/0213812 | A1* | 7/2019 | Burns | G06Q 20/227 |
| 2019/0259014 | A1* | 8/2019 | Katayama | G06F 3/14 |
| 2019/0303991 | A1* | 10/2019 | Ford | A61K 8/9789 |
| 2019/0325691 | A1* | 10/2019 | Tovey | G07F 17/12 |
| 2020/0051148 | A1* | 2/2020 | Green | G06V 40/13 |
| 2020/0058057 | A1* | 2/2020 | Ouyang | G06Q 30/0607 |
| 2020/0167843 | A1* | 5/2020 | Nguyen | G06Q 30/0607 |
| 2020/0213446 | A1* | 7/2020 | Hardy | G06Q 30/016 |
| 2020/0258179 | A1* | 8/2020 | Passe | G06Q 50/26 |
| 2020/0312064 | A1* | 10/2020 | Deal | G06Q 30/0607 |
| 2020/0364685 | A1* | 11/2020 | Ibe | G07F 9/002 |
| 2020/0370340 | A1* | 11/2020 | Fetchel Frahm | E05B 35/001 |
| 2021/0042762 | A1* | 2/2021 | Budano | G06K 7/1413 |
| 2021/0065267 | A1* | 3/2021 | Smith | G06Q 20/4014 |
| 2021/0073765 | A1* | 3/2021 | Xu | G07F 9/009 |

FOREIGN PATENT DOCUMENTS

| | | | | |
|---|---|---|---|---|
| JP | 2014154162 | A | 8/2014 | |
| JP | 2018081686 | A * | 5/2018 | G06Q 10/087 |
| JP | 2018081686 | A | 5/2018 | |
| WO | 2018167570 | A2 | 9/2018 | |
| WO | WO-2018167570 | A2 * | 9/2018 | G06F 21/31 |
| WO | WO-2019217936 | A1 * | 11/2019 | G06Q 20/2295 |

OTHER PUBLICATIONS

Young, Lee, "Written Opinion", International Application No. PCT/US2020/040092, dated Sep. 28, 2020, 6 pages.

Michael Krey, "Point-Of-Sale Technology is Changing The Retailing Industry; Kiosks and Self-Checkout Lanes Are Among Most Important Trends in POS", Inventor's business daily 2003: A04—Print. (Year:2003).

Krevor, B S, A Lieberman, and K Gerlach, "Application of Consumer Protection Authority in Preventing Tobacco Sales to Minors", Tobacco control 11.2 (2002): 109-111. Web (Year:2002).

Van Hoof, Joris J, and Ben C.J van Velthoven, "Remote Age Verification to Prevent Underage Alcohol Sales, First Results from Dutch Liquor Stores and the Economic Viability of National Adoption", The International journal of drug policy 26.4 (2014): 364-370. Web. (Year: 2014).

* cited by examiner

SYSTEM FOR SALE-RESTRICTED ITEMS MANAGEMENT

BACKGROUND

There are many products which are sale-restricted based on the age of the purchaser, the type of product, the location of the purchase, etc. For example, the sale of tobacco products may be sale-restricted based on the age of the purchaser. In many locations, a person under the age of twenty-one is not permitted to purchase tobacco products. Therefore, these types of restricted products typically are not available for purchase via a self-checkout lane. To purchase sale-restricted products, a customer goes through a manned checkout lane to request the sale-restricted product from a cashier or other employee. However, this can be a time-consuming and inefficient process.

SUMMARY

Some examples provide a system for managing sale-restricted items for hosted self-checkout. The system includes at least one processor communicatively coupled to a memory. A user interface device provides a graphical user interface (GUI) for displaying a restricted items selection control. A control component outputs a sale-restricted item selection control on the GUI. A list component displays a list of sale-restricted items available for purchase via the GUI on condition a first user activates the sale-restricted item selection control. A selection component displays a set of options associated with an item identifier (ID) of a sale-restricted item selected from the list of sale-restricted items selected by the first user. A notification component transmits an item retrieval notification to a user device associated with a second user. A verification component authorizes completion of a transaction associated with purchase of the sale-restricted item by the first user on condition an age verification is obtained from the second user.

Other examples provide a computer-implemented method for managing sale-restricted items for hosted self-checkout. A control component displays a sale-restricted item selection control on a GUI associated with a self-checkout (SCO) register. A list component presents a per-store customized list of sale-restricted items available for purchase via the GUI responsive to activation of the sale-restricted item selection control. A notification component sends an item retrieval notification to a user device associated with a second user. The notification includes an identification of a selected sale-restricted item and a location of the selected sale-restricted item within a sale-restricted items storage device. A verification component authorizes completion of a transaction associated with purchase of the selected sale-restricted item by the first user responsive to receiving an age verification from the second user.

Still other examples provide a computer storage device having computer-executable instructions for managing sale-restricted items for hosted self-checkout via a sale-restricted items manager component. The sale-restricted items manager component displays a sale-restricted item selection control on a GUI associated with a self-checkout (SCO) register for activation by a first user. The sale-restricted items manager component presents a per-store customized list of sale-restricted items available for purchase via the GUI responsive to activation of the sale-restricted item selection control. The sale-restricted items manager component sends an item retrieval notification to a user device associated with a second user. The notification includes an identification of a selected sale-restricted item and a location of the selected sale-restricted item within a sale-restricted items storage device. The sale-restricted items manager component authorizes completion of a transaction associated with purchase of the selected sale-restricted item by the first user responsive to receiving an age verification from the second user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable offering sale-restricted items for purchase via an automated self-checkout. In some examples, a sale-restricted items manager displays a list of sale-restricted items which are available for purchase to a user via a graphical user interface (GUI). After the user selects desired items, the system transmits an alert notifying qualified personnel to retrieve the selected items and verify the user is qualified (appropriate age) to purchase the selected products. This enables improved customer access to products while reducing wait time associated with manned registers.

Figure 1:
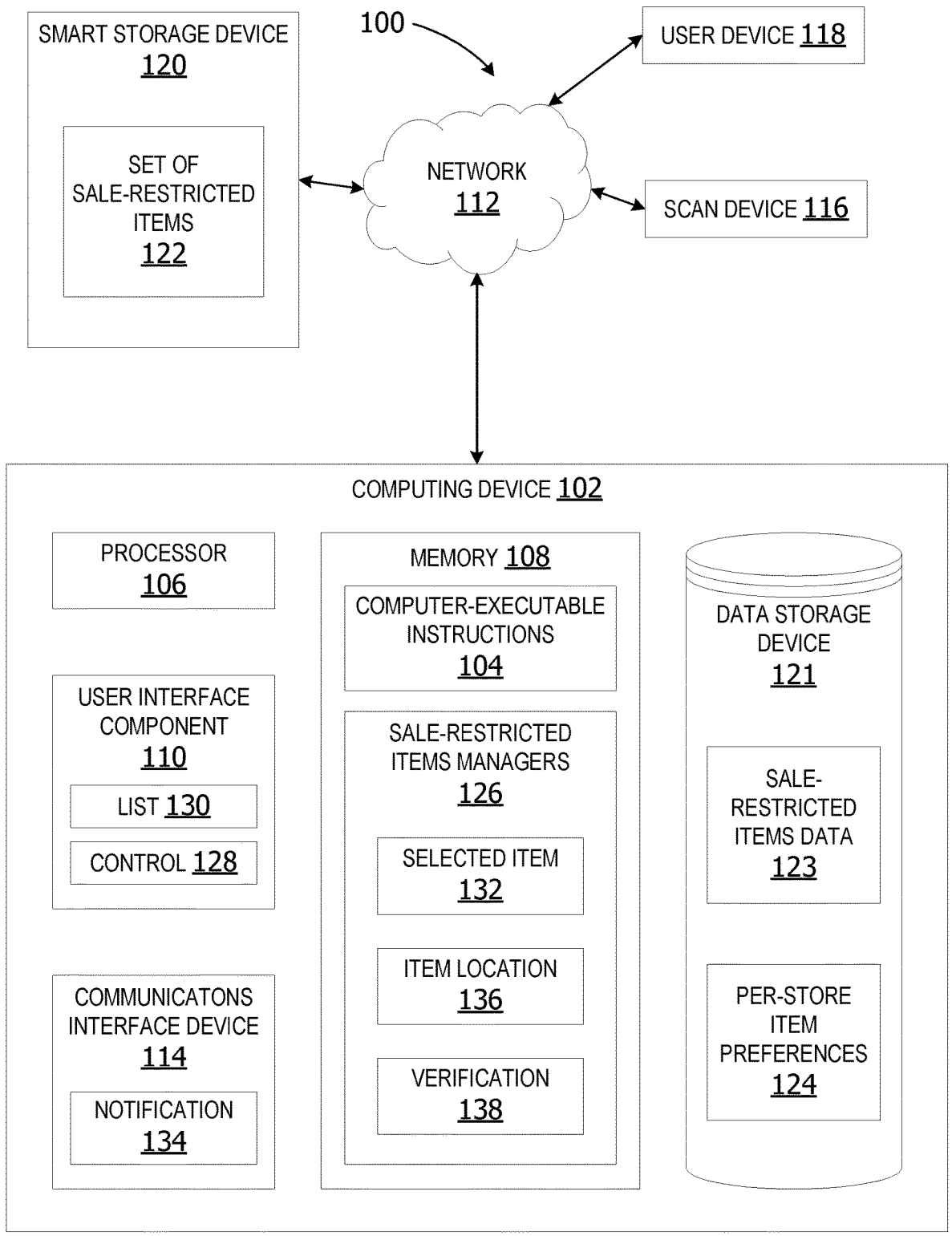
FIG. 1 is an exemplary block diagram illustrating a system for managing hosted sale-restricted item processing via a self-checkout (SCO) device.

Referring again to FIG. 1, an exemplary block diagram illustrates a system 100 for managing hosted sale-restricted item processing via a self-checkout device. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, self-checkout (SCO) device or tabletop devices. Additionally, the computing device 102 can represent a group of processing units or other computing devices.

In some examples, the computing device 102 has at least one processor 106 and a memory 108. The computing device 102 in other examples includes a user interface component 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 7, FIG. 8 and FIG. 9).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a scan device 116, a user device 118, and/or a smart storage device 120, can occur using any protocol or mechanism over any wired or wireless connection. In some examples, the communications interface component 114 is operable with short range communication technologies such as by using near-field communication (NFC) tags.

The scan device 116 is a device for scanning an item to identify the item type, item variety, item size and/or item identifier (ID). The scan device 116 can be implemented as a barcode scanner for scanning a universal product code (UPC), matrix barcode or other type of barcode. The scan device 116 in other examples can include a radio frequency identifier (RFID) tag reader for obtaining item data from an RFID tag. The scan device 116 in still other examples can include an image capture device such as a camera for capturing images of an item. The images can be analyzed to determine if an item retrieved by a SCO host is the correct item requested by the customer.

The user device 118 represent any device executing computer-executable instructions. The user device 118 can be implemented as a mobile computing device, such as, but not limited to, a wearable computing device, a mobile telephone, laptop, tablet, computing pad, netbook, gaming device, and/or any other portable device. The user device 118 includes at least one processor and a memory. The user device 118 can also include a user interface component.

The smart storage device 120 for storing a set of sale-restricted items 122 in a lockable storage inaccessible to unauthorized users. The smart storage device 120 can include an automated item dispenser, a set of lockers, a set of lockable cabinets, or any other type of storage device. The lock can be any type of lock, such as, but not limited to, a key lock, a coded lock, a combination lock, a biometric lock, etc. The key lock can be a lock opened with a physical key or a lock opened with an electronic key.

In some examples, the lock associated with the storage device can be opened via the user device 118. In these examples, the lock can be opened via a beacon, NFC signal, BLUETOOTH® or other signal sent by the user device 118 to the smart storage device 120.

A sale-restricted item in the set of sale restricted items 122 is an item which is unavailable for purchase to some users based on their age or other qualifications. For example, tobacco products are typically sale-restricted based on age. In some locations, sale of tobacco products is restricted to individuals twenty-one years of age or older. Likewise, alcohol can be sale-restricted based on age. For example, in some locations, alcohol sales are limited to individuals eighteen years old or older. Other sale-restricted items can include, without limitation, baby formula, some over-the-counter medications, spray paint, carbon dioxide cartridges, razors, etc.

The system 100 in other examples can also optionally include a cloud server (not shown). A cloud server is a logical server providing services to the computing device 102 or other clients, such as, but not limited to, the user device 118. The cloud server is hosted and/or delivered via the network 112. In some non-limiting examples, the cloud server is associated with one or more physical servers in one or more data centers. In other examples, the cloud server is associated with a distributed network of servers.

The system 100 can optionally include a data storage device 121 for storing data, such as, but not limited to sale-restricted items data 123. The sale-restricted items data 123 can include data identifying sale-restricted items available in inventory, item varieties, packaging sizes, etc. The per-store item preferences 124 can include identification of sale-restricted items most commonly purchased at a particular store. The per-store item preferences can be determined based on transaction data and/or sales trend data.

The data storage device 121 can include one or more different types of data storage devices, such as, for example, one or more rotating disks drives, one or more solid state drives (SSDs), and/or any other type of data storage device. The data storage device 121 in some non-limiting examples includes a redundant array of independent disks (RAID) array. In other examples, the data storage device 121 includes a database, such as, but not limited to, the database 500 in FIG. 5 below.

The data storage device 121 in this example is included within the computing device 102, attached to the computing device, plugged into the computing device or otherwise associated with the computing device 102. In other examples, the data storage device 121 includes a remote data storage accessed by the computing device via the network 112, such as a remote data storage device, a data storage in a remote data center, or a cloud storage.

The memory 108 in some examples stores one or more computer-executable components, such as, but not limited to, a sale-restricted items manager 126. The sale-restricted items manager 126 displays a graphical control 128 (icon or graphic) on a GUI associated with a SCO device for activation by a first user, such as a customer utilizing the SCO to purchase one or more items. The user can select or activate the control by touching the icon on a touchscreen, pressing a key, using a stylus pen, pressing a button, speaking a verbal command into a speaker or any other method for selecting an option from a GUI menu option or activating a graphical control.

The sale-restricted items manager 126 detects activation of the control 128 and presents a per-store customized list 130 of sale-restricted items available for purchase using the SCO. The list is a set of items. In some non-limiting examples, the list includes a portion of a product catalogue listing tobacco products or other sale-restricted items so customers can select those products for purchase via the SCO device without physically accessing those items.

The sale-restricted items manager 126 receives the user's selection of a type of item. The type of item can be a type of a tobacco product or other sale-restricted item. If the item is a tobacco product, the type of item can include cigarettes, cigars, smokeless cigarettes, e-cigarettes, chewing tobacco or any other type of tobacco product.

The sale-restricted items manager 126 displays an age verification prompt to the user requesting the user verify compliance with age requirements for purchase of the selected type of product. The user provides input indicating whether the user is in compliance with the relevant age restriction. If the user verifies age, the sale-restricted items manager 126 continues by providing any additional options associated with the type of product.

In some examples, the sale-restricted items manager 126 presents a set of options associated with the selected item 132. The user can select options such as, but not limited to, brand, quantity of the selected item, variety, package size, etc. Variety refers to possible flavors, or other options available for a particular brand of a product. In one example, a variety option for cigarettes might include filtered, unfiltered, menthol flavored, etc. Once the user has selected an item from the list and chosen the appropriate options for the item, the sale-restricted items manager 126 sends an item retrieval notification to a user device 118 associated with a second authorized user, such as an employee, manager or other personnel authorized to assist with sale-restricted items.

The notification 134 in some examples includes an identification of the selected item 132 and a location 136 of the selected sale-restricted item within a sale-restricted items storage device, such as, but not limited to, the smart storage device 120. The second user provides additional age verification 138. The sale-restricted items manager 126 then authorizes completion of a transaction associated with purchase of the selected sale-restricted item by the first user responsive to receiving the additional age verification 138 from the second user via user device 118.

In some examples, the system 100 permits customers to remotely order secured items from a SCO. The secured items can include any type of items kept secure in a store for antitheft and/or regulatory compliance. The system enables customers to have access to restricted items via the GUI to save labor, decrease customer wait time and reduce shrink associated with unsecured items.

A GUI is provided in the example shown in FIG. 1. However, the examples are not limited to a GUI. In other examples, the sale-restricted items list is presented via a menu-driven interface or any other type of interface.

Figure 2:
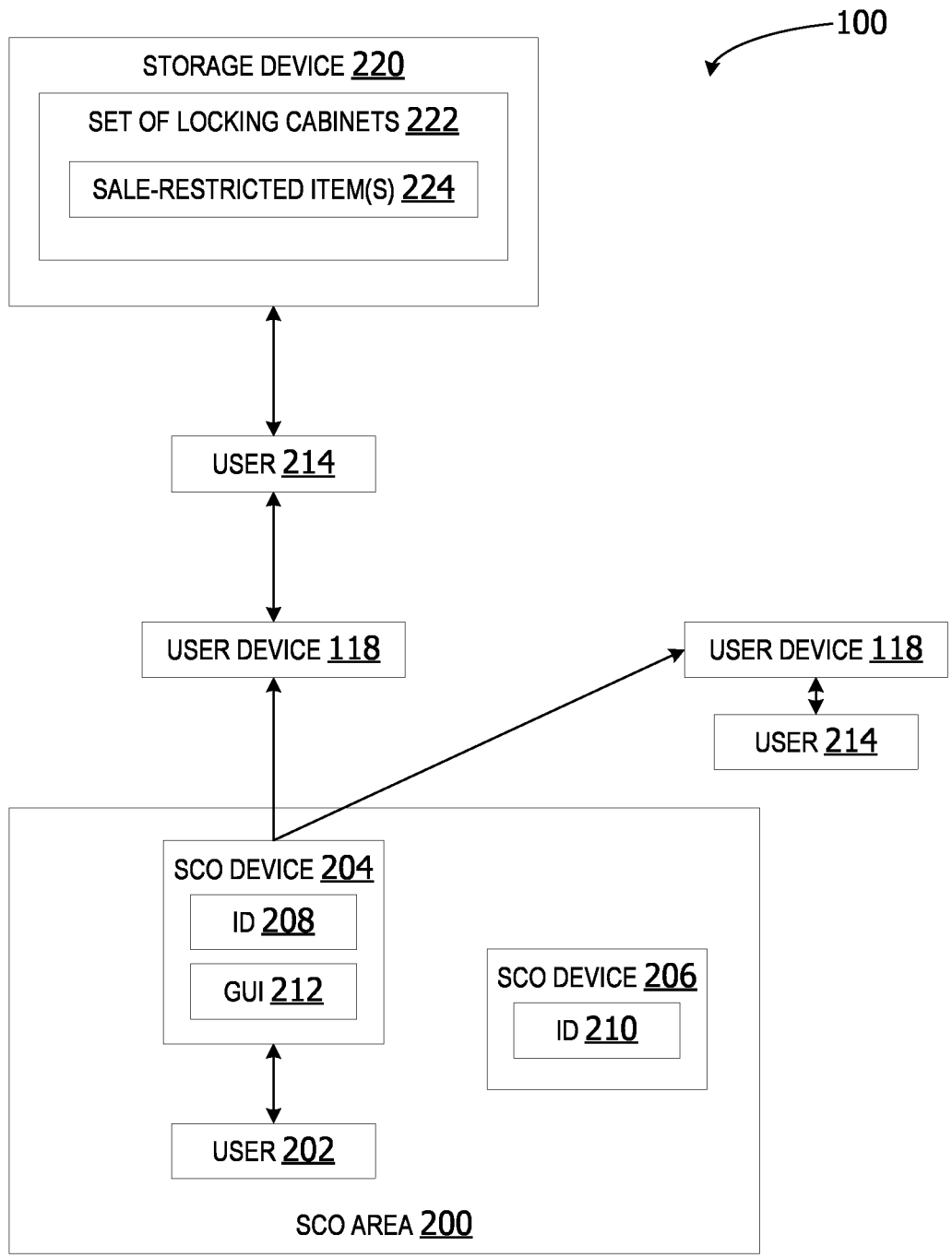
FIG. 2 is an exemplary block diagram illustrating the system for managing hosted sale-restricted item processing via a SCO device including a set of user devices.

FIG. 2 is an exemplary block diagram illustrating the system 100 for managing hosted sale-restricted item processing via a SCO device including a set of user devices. In this example, a SCO area 200 includes a user 202 utilizing a SCO device 204 to complete SCO of one or more items. The SCO area 200 in this example includes two SCO devices, SCO device 204 and SCO device 206. However, in other examples, the SCO area 200 can include a single SCO device, as well as three or more SCO devices. An SCO device is an automated computing device including one or more scan devices for scanning items during a SCO process. The SCO can optionally include a conveyor belt and/or a bagging area. An SCO device can also be referred to an SCO register.

In this example, each SCO device includes an identifier (ID) identifying the SCO device. The SCO device 204 has ID 208 and the SCO device 206 has an ID 210. Each register has a unique ID. The ID can be a register number, a barcode or any other type of identifier. The SCO device 204 presents a GUI 212 displaying a control or other icon for activating selection of a sale-restricted item via the SCO device.

When a user selects a sale-restricted item for purchase via the list of available sale-restricted items presented to the user, the SCO device transmits a notification to a set of user devices associated with authorized personnel, such as a SCO host. Authorized personnel includes any employee, such as an associate or manager, authorized to assist customers with the purchase of sale-restricted items. In this example, the set of user devices include the user device 118 associated with a user 214 and a user device 216 associated with an authorized user 218. In other words, either user 214 or user 218 can assist the user 202 (customer) with purchase of the selected sale-restricted item in this non-limiting example.

The user 214 receives the notification via the user device 118. The notification provides the user 214 with an identification of the selected item, including the type of item, brand, variety, quantity, and any other item data. The notification also includes an identification of the location of the selected item within a storage device 220 and the SCO device ID 208 associated with the user 202 requesting the sale-restricted item. The storage device 220 can be a smart storage device connected to a network or an unconnected storage device. In this non-limiting example, the storage device 220 includes a set of locking cabinets 222 storing one or more sale-restricted item(s) 224, such as, but not limited to, the set of sale-restricted items 122 in FIG. 1 above.

In this non-limiting example, the authorized user 214 retrieves the selected sale-restricted item from the storage device 220. The user 214 delivers the item to the user 202 at the SCO device 204 corresponding to the ID 208 included in the notification. The authorized user 214, in some examples, performs age verification prior to surrendering the sale-restricted item to the requesting customer.

Figure 3:
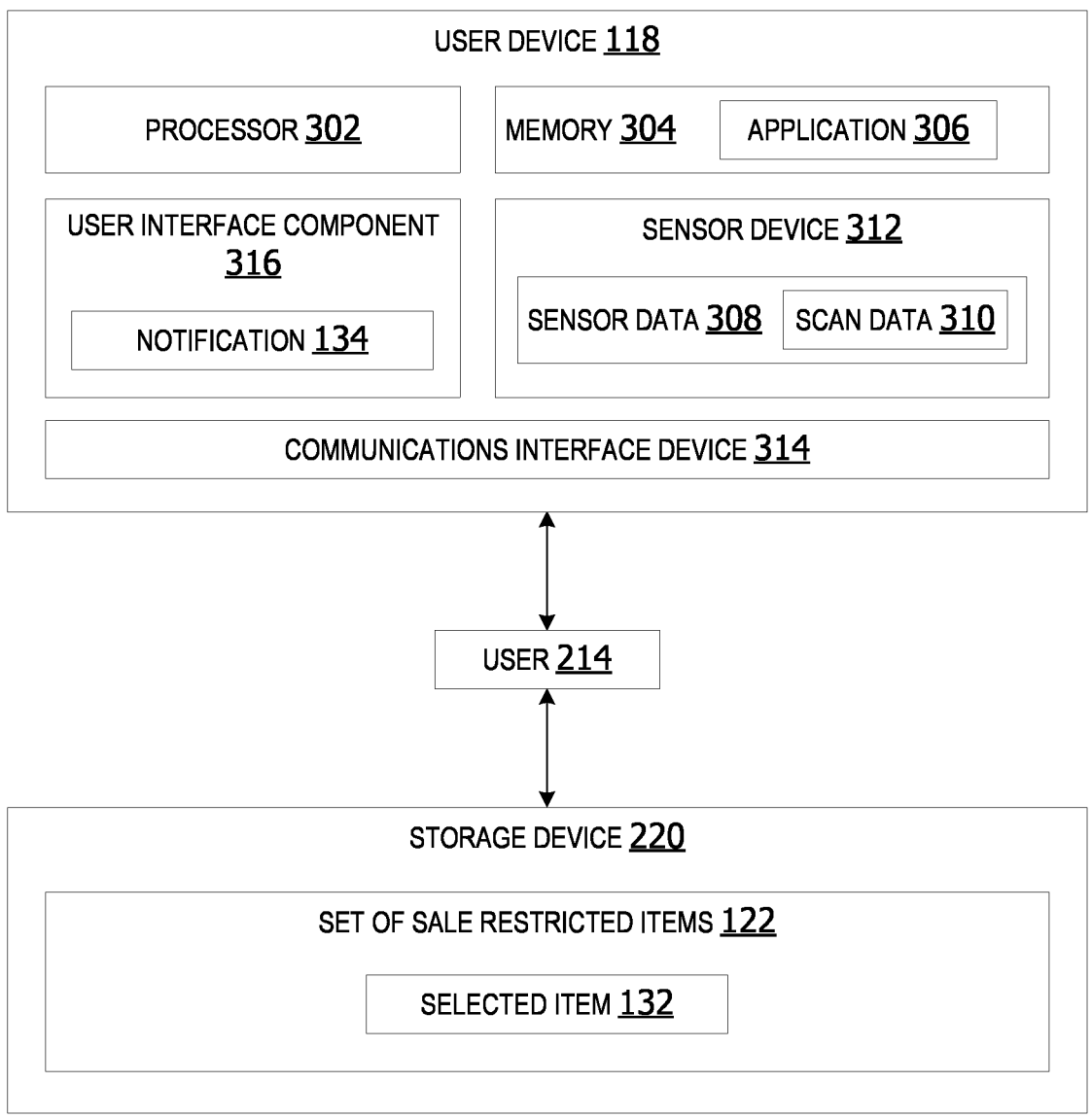
FIG. 3 is an exemplary block diagram illustrating a user device receiving a notification associated with a sale-restricted item from a SCO device.

FIG. 3 is an exemplary block diagram illustrating a user device 118 receiving a notification 134 associated with a sale-restricted item from a SCO device. The user device 118 in this example includes at least one processor 302 and a memory 304 storing an application 306. The application 306 receives sale-restricted item retrieval alerts/notifications from one or more SCO devices. The application 306 in some examples also analyzes sensor data 308, such as scan data 310 generated by a scan device scanning a barcode on an item, to determine if an authorized user has retrieved a correct item for a requesting customer. The sensor data 308 is generated by a sensor device 312 scanning at least a portion of an item. The sensor device 312 can be implemented within the user device 118 or as a separate hand-held scan device transmitting scan data to the user device 118 via a communications interface device 314 enabling connection to a network.

The user device 118 in some examples, displays the notification 134 to the authorized user via a user interface component 316. The user interface component can be implemented as a display screen, such as a touch screen or augmented reality display device. The user interface component 316 can also include a speaker for audio output and/or any other type of output device.

Figure 4:
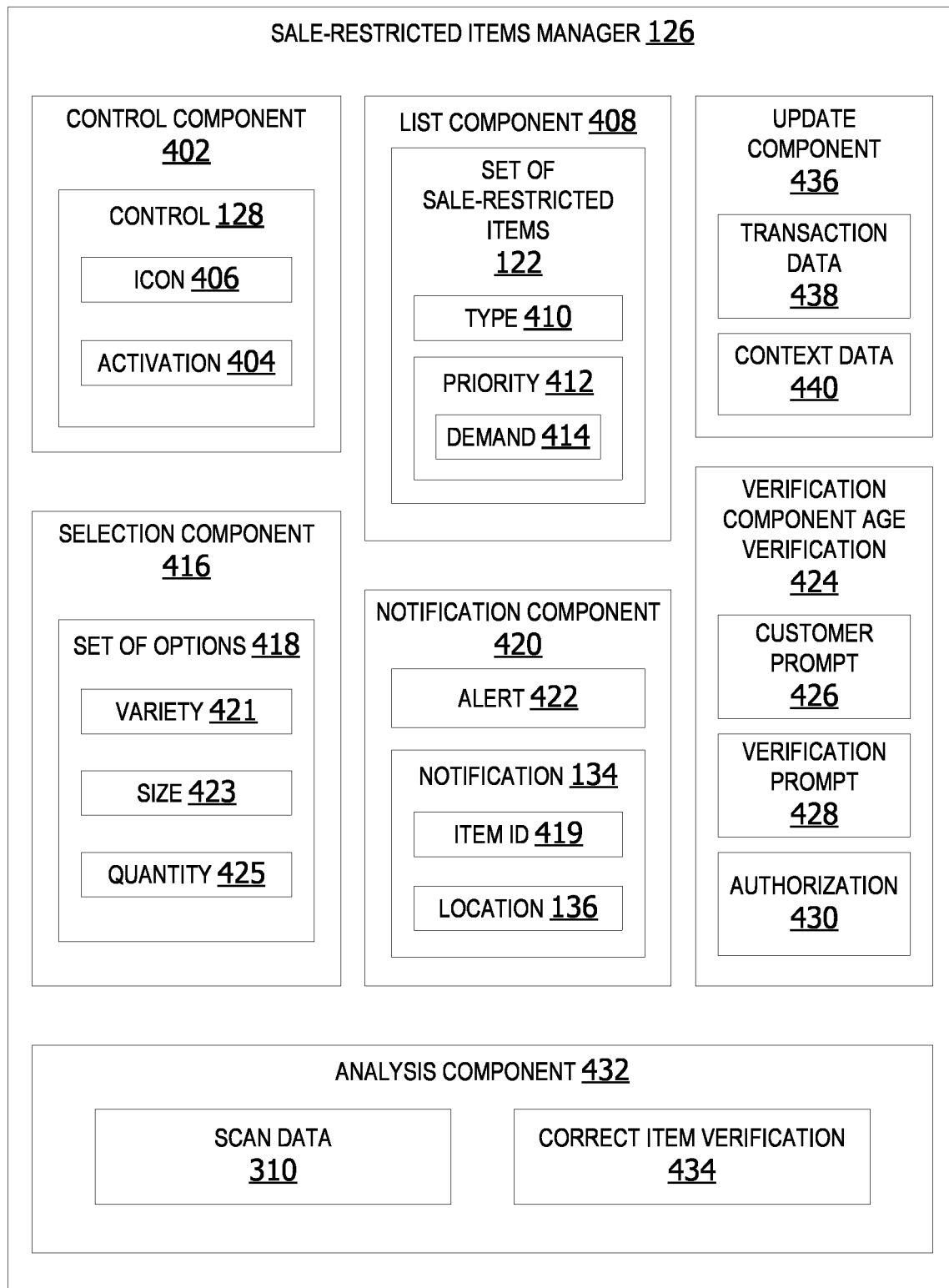
FIG. 4 is an exemplary block diagram illustrating a sale-restricted items manager for hosted sale-restricted item processing via a SCO device.

FIG. 4 is an exemplary block diagram illustrating a sale-restricted items manager 126 for hosted sale-restricted item processing via a SCO device. In some examples, a control component 402 outputs a sale-restricted item selection control 128 on the GUI for activation 404 by a user to initiate selection of sale-restricted items for purchase. The control 128 in some examples is an icon 406 or other graphical representation of a button or menu item enabling the user (customer) utilizing the SCO device to view a list of sale-restricted items.

A list component 408 presents/displays a set of sale-restricted items 122 available for purchase via the GUI in a list form upon activation 404 of the control 128. In some examples, the control component 402 outputs an age verification prompt requesting the customer verify their age prior to displaying the set of sale-restricted items 122 to the user.

The items in the set of sale-restricted items 122 can be displayed according to type 410. Type 410 refers to type of product. The type of product can include categories, such as, but not limited to, tobacco products, alcohol, paint products, baby formula, razors, etc. The type 410 can also include sub-categories, such as, types of tobacco products within the tobacco products category. For example, the types of tobacco products can include cigarettes, cigars, smokeless cigarettes, etc.

The items in the set of sale-restricted items 122 can also be presented in the list in order of priority 412 based on demand 414 for the items. In other words, items having the greatest per-store demand or highest sales are listed/displayed first. The priority 412 listing of items can vary on a per-store basis. Thus, the order in which sale-restricted products are listed can be customized based on transaction history data and other local factors for each store.

A selection component 416 displays a set of options 418 associated with an item identifier (ID) 419 of a sale-restricted item selected from the list of sale-restricted items selected by the customer (user). The set of options 418 can include options such as, but not limited to, variety 421, size 423 and/or quantity 425. Another option can include selection by brand name. Variety 421 refers to options such as flavor, filtering, ingredients, or other options. The size 423 refers to the packing/unit size. The quantity 425 refers to the number of units or how many of each type of item the customer wants. For example, the user can select a brand A of an item, a variety having menthol flavor, a carton size and a quantity of one indicating that the user want a single carton of brand A in menthol flavor.

A notification component 420, in other examples, transmits an item retrieval alert 422 to a user device associated with a user authorized to retrieve the selected item. The alert 422 can including the notification 134 instructing the user to retrieve an item from a location 136 of a storage device having an item ID 419. The notification can optionally also include an identification or description of the user's selected brand, variety, size and quantity of the item, in addition to the item's location 136.

A verification component 424 performs authorization 430 for completion of a transaction associated with purchase of the sale-restricted item by the customer. In some examples, the verification component 424 outputs a customer prompt 426 requesting the customer verify their age prior to authorizing the transaction. In other examples, the verification component 424 outputs a verification prompt 428 to an authorized personnel requesting the authorized user verify the customer's age prior to authorization 430 of the transaction. If the customer's age is unverified or the customer is ineligible for purchase, the transaction is unauthorized. The system instructs the authorized user to return the sale-restricted item to the storage device if the customer is unauthorized based on failure to verify age.

In other non-limiting examples, an analysis component 432 analyzes scan data 310 received from a scan device associated with the authorized user to verify the correct item is retrieved. Upon correct item verification, the authorized user is instructed to deliver the item to the identified SCO device. The analysis component in this example is executed on the SCO device. In other examples, the analysis component 432 is executed within the application running on the user device.

An update component 436 in yet other examples updates the list of sale-restricted items to generate a per-store customized list of items for presentation to customers. The items are listed in an order of priority based on per-store demand for each sale-restricted item. The update component 436 analyzes transaction data indicating historical sales trends for items and/or context data 440 potentially influencing sales to determine the order in which items are displayed within the list. This enables creation of a customized list of sale-restricted items based on local transaction data and customer preferences.

The sale-restricted item manager in this example is implemented in a SCO device. In other examples, the sale-restricted item manager component can be implemented in whole or in part on a cloud server communicating with one or more SCO devices.

Figure 5:
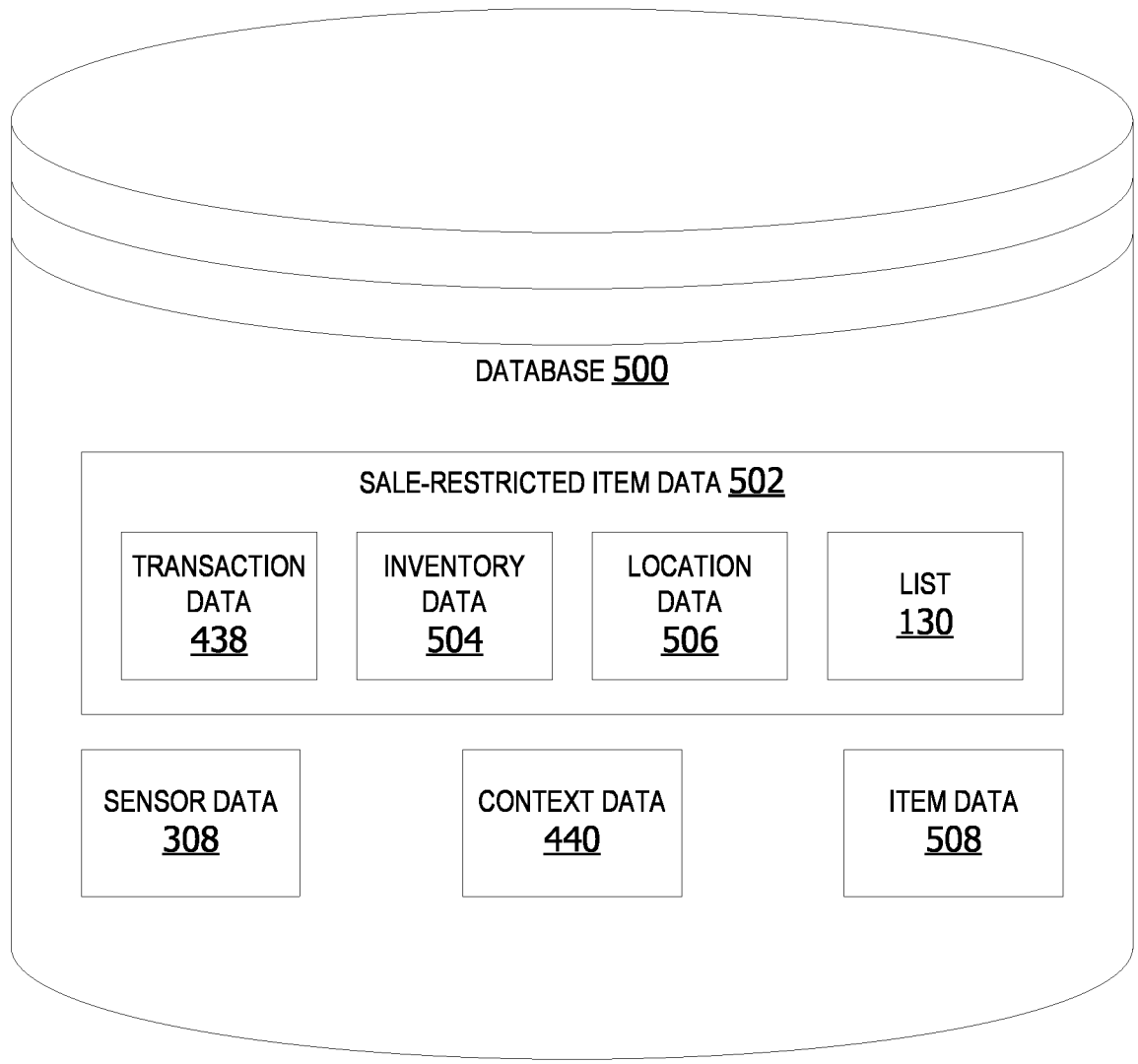
FIG. 5 is an exemplary block diagram illustrating a database storing sale-restricted item data.

FIG. 5 is an exemplary block diagram illustrating a database 500 storing sale-restricted item data 502. The database 500 is implemented on a data storage device, such as, but not limited to, the data storage device 121 in FIG. 1. The database 500, in other examples, can also be implemented on a cloud storage. In this example, the sale-restricted item data 502 includes transaction data 438 associated with historical item sales, inventory data 504 indicating which sale-restricted items are available in inventory, location data 506 identifying the location of sale-restricted items in the storage device and/or the list 130 of sale-restricted items. The sale-restricted item data 502 can also include regulations and compliance data indicating age restrictions, quantity restrictions and/or any other sale-related restrictions associated with each item in the list 130.

The database 500 in other examples can also store sensor data 308, context data 440, and/or item data 508. The context data 440 can include data associated with seasonality, weather, local events, etc. The item data 508 can include item type, variety, brand, size options, etc.

Figure 6:
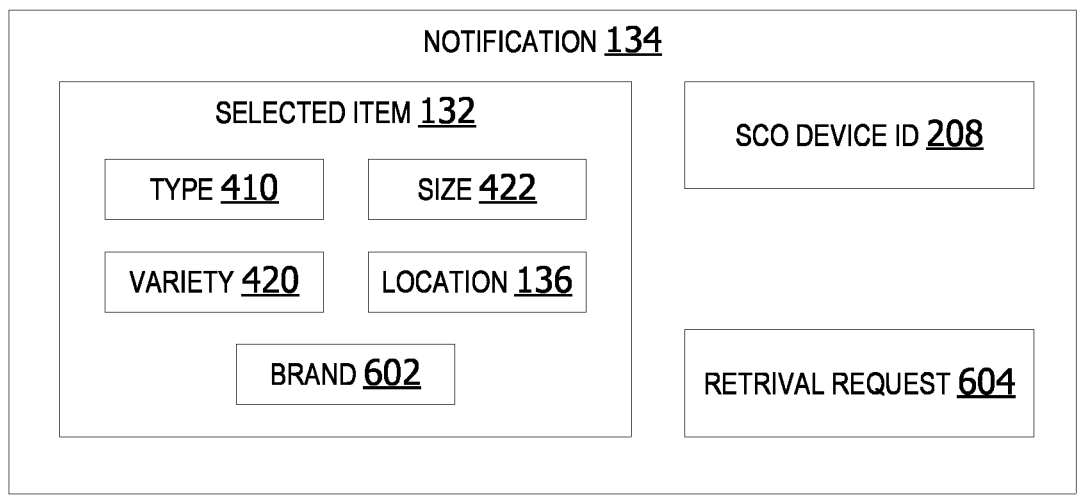
FIG. 6 is an exemplary block diagram illustrating a sale-restricted item notification.

FIG. 6 is an exemplary block diagram illustrating a sale-restricted item notification 134. In this non-limiting example, the sale-restricted item notification 134 includes an identification of the selected item 132, including the type 410, brand 602, variety 421, size 423 and the location 136 of the item in the storage device. The notification can also optionally include an image of the item packaging. The notification 134 also includes a SCO device ID 208 and a retrieval request 604. The retrieval request 604 instructs an authorized user to retrieve the selected item 132 from the location 136 in the storage device and deliver the item to the SCO device associated with the SCO device ID 208.

Figure 7:
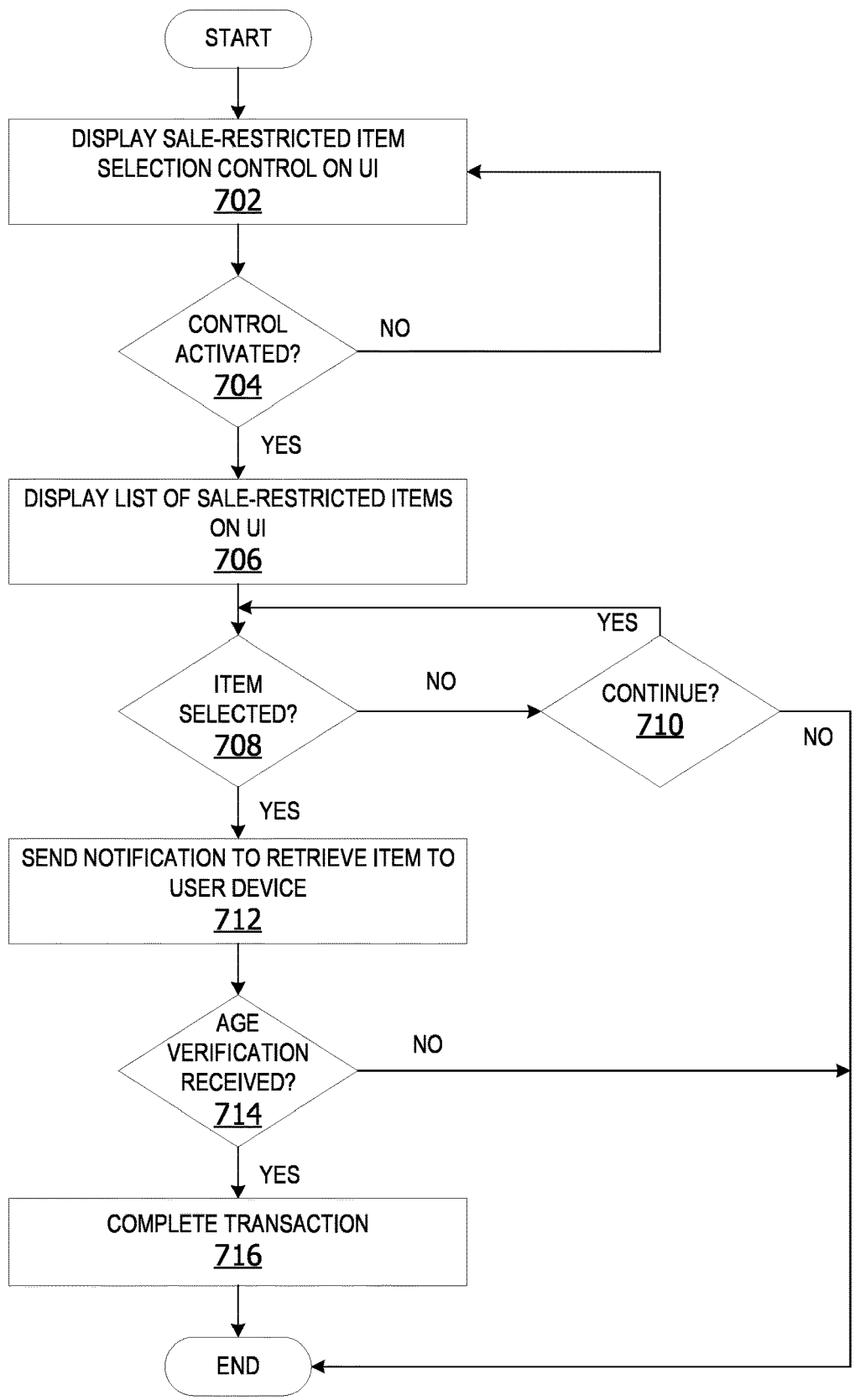
FIG. 7 is an exemplary flow chart illustrating operation of the computing device to perform a sale-restricted item transaction via a SCO device.

FIG. 7 is an exemplary flow chart illustrating operation of the computing device to perform a sale-restricted item transaction via a SCO device. The process shown in FIG. 7 is performed by a sale-restricted items manager component, executing on a computing device, such as the computing device 102 or the user device 118 in FIG. 1.

The process begins by displaying a sale-restricted item selection control on a UI at 702. The control is a graphical icon enabling a user to activate the sale-restricted item process at the SCO device, such as, but not limited to, the control 128 in FIG. 1. If the control is activated at 704, the sale-restricted item manager displays a list of sale-restricted items on the UI at 706. A determination is made whether an item is selected by the customer/user at 708. If no, a determination is made whether to continue at 710. If no, the process terminates thereafter.

Returning to 708, when an item is selected from the list by the customer, the sale-restricted item manager sends a notification to retrieve the item to a user device associated with personnel authorized to retrieve the item at 712. The sale-restricted item manager determines whether age verification is received at 714. The age verification is provided by the authorized personnel. If yes, the sale-restricted item manager permits completion of the transaction to purchase the sale-restricted item at 716. The process terminates thereafter.

While the operations illustrated in FIG. 7 are performed by a computing device, aspects of the disclosure contemplate performance of the operations by other entities. In a non-limiting example, a cloud service performs one or more of the operations.

Figure 8:
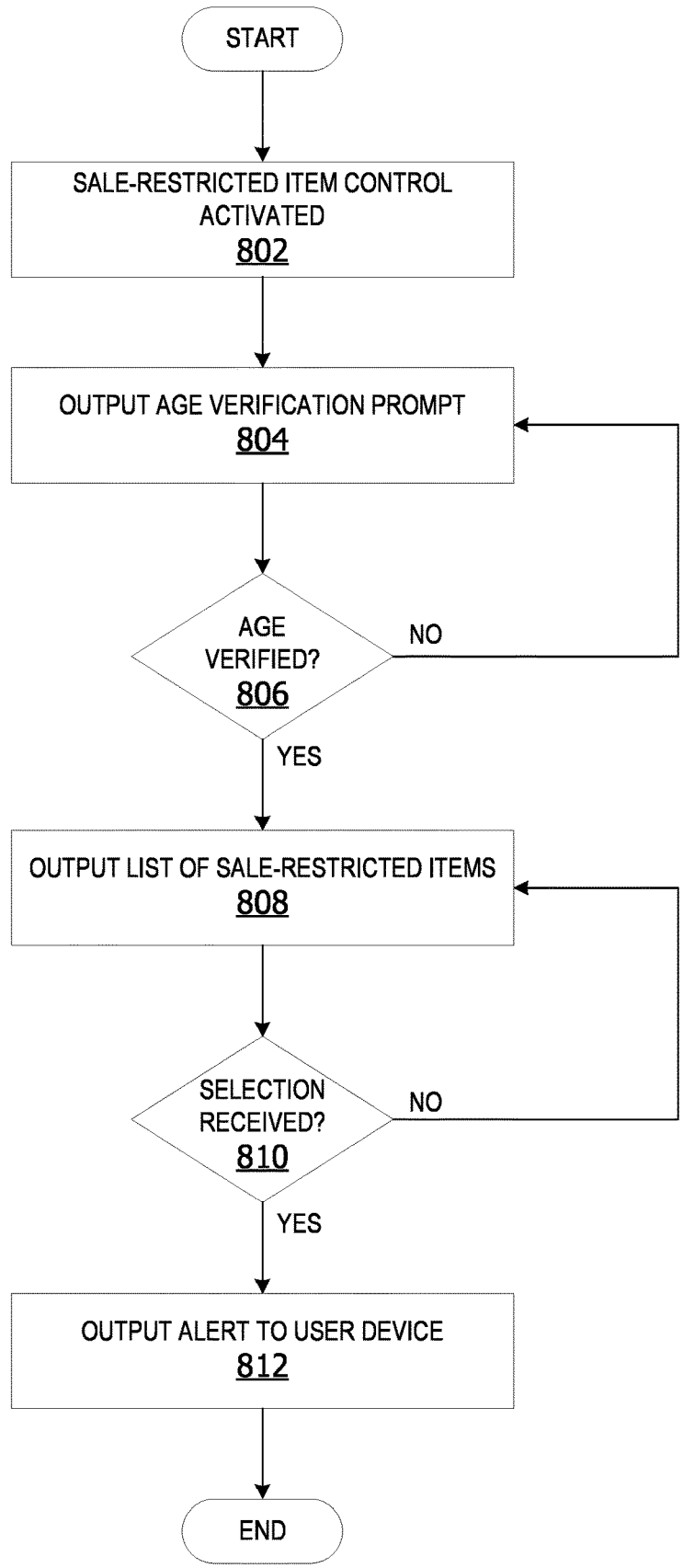
FIG. 8 is an exemplary flow chart illustrating operation of the computing device to generate a sale-restricted item retrieval alert.

FIG. 8 is an exemplary flow chart illustrating operation of the computing device to generate a sale-restricted item retrieval. The process shown in FIG. 8 is performed by a sale-restricted items manager component, executing on a computing device, such as the computing device 102 or the user device 118 in FIG. 1.

The process begins with activation of a sale-restricted item control at 802. The sale-restricted items manager component outputs an age verification prompt to the customer at 804. If the customer's age is verified at 806, the sale-restricted items manager component outputs a list of sale-restricted items available for purchase at 808. If a customer selection of at least one sale-restricted item from the list is received at 810, the sale-restricted items manager component outputs an alert to the user device at 812. The alert is a sale-restricted item retrieval alert, such as, but not limited to, the alert 422 in FIG. 4 above. The process terminates thereafter.

While the operations illustrated in FIG. 8 are performed by a computing device, aspects of the disclosure contemplate performance of the operations by other entities. In a non-limiting example, a cloud service performs one or more of the operations.

Figure 9:
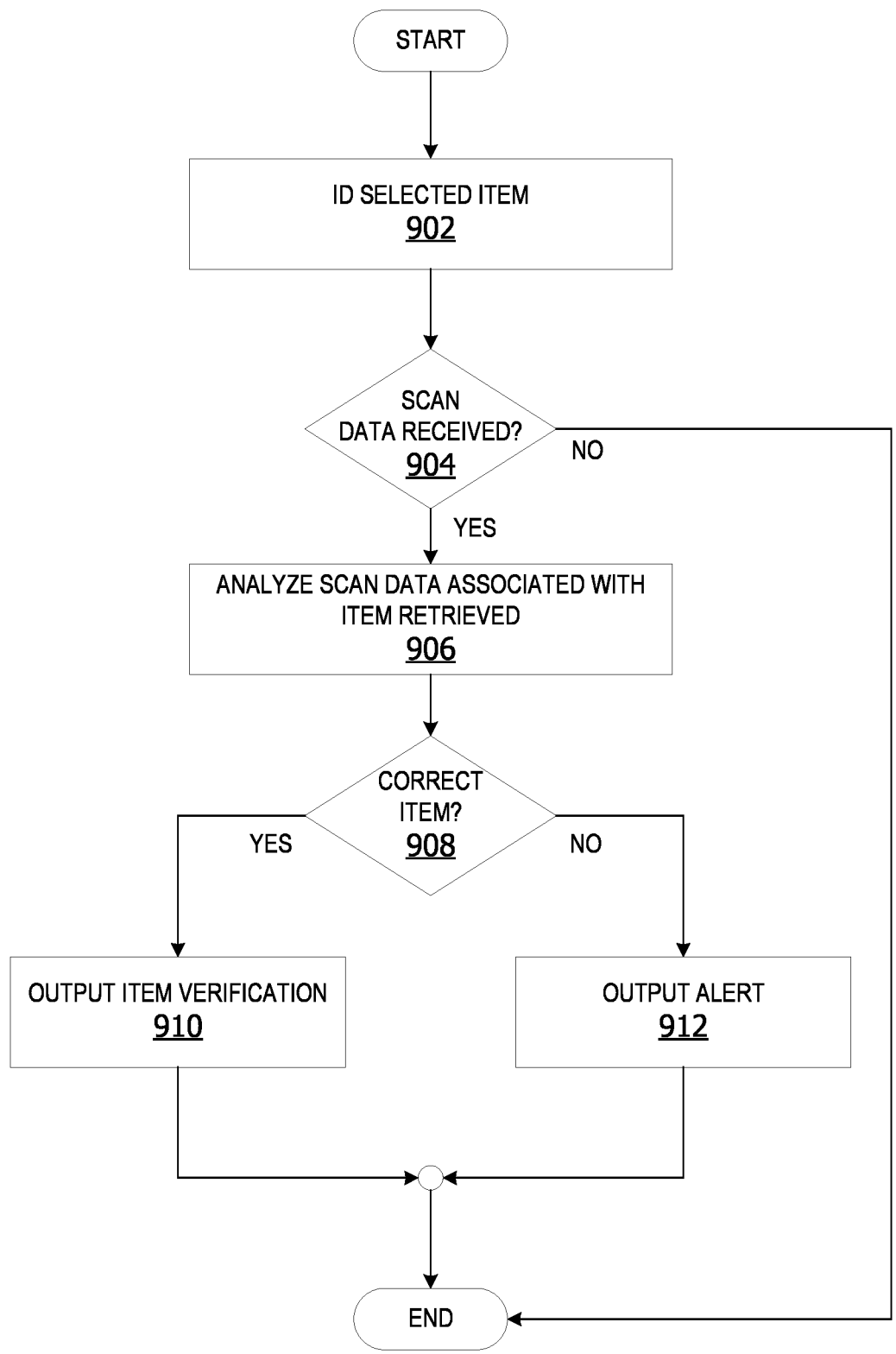
FIG. 9 is an exemplary flow chart illustrating operation of the computing device to verify correct sale-restricted item retrieval.

FIG. 9 is an exemplary flow chart illustrating operation of the computing device to verify correct sale-restricted item retrieval. The process shown in FIG. 9 is performed by a sale-restricted items manager component, executing on a computing device, such as the computing device 102 or the user device 118 in FIG. 1.

The process begins by identifying a sale-restricted item selected by a user at 902. An analysis component determines if scan data is received at 904. The scan data is data generated by a sensor device, such as, but not limited to, the scan data 310 in FIG. 3. If yes, the analysis component analyzes the scan data associated with the retrieved item at 906. The analysis can include comparing the scan data with item data associated with the selected item. The analysis component determines if the retrieved item is the correct item at 908. If yes, an item verification is output at 910. The process terminates thereafter.

If the analysis does not indicate the retrieved item corresponds to the selected item, an incorrect item alert is output to the user. The alert can be output via a user interface, such as, but not limited to, the user interface component 110 in FIG. 1 or the user interface component 316 in FIG. 3. The process terminates thereafter.

While the operations illustrated in FIG. 9 are performed by a computing device, aspects of the disclosure contemplate performance of the operations by other entities. In a non-limiting example, a cloud service performs one or more of the operations.

Figure 10:
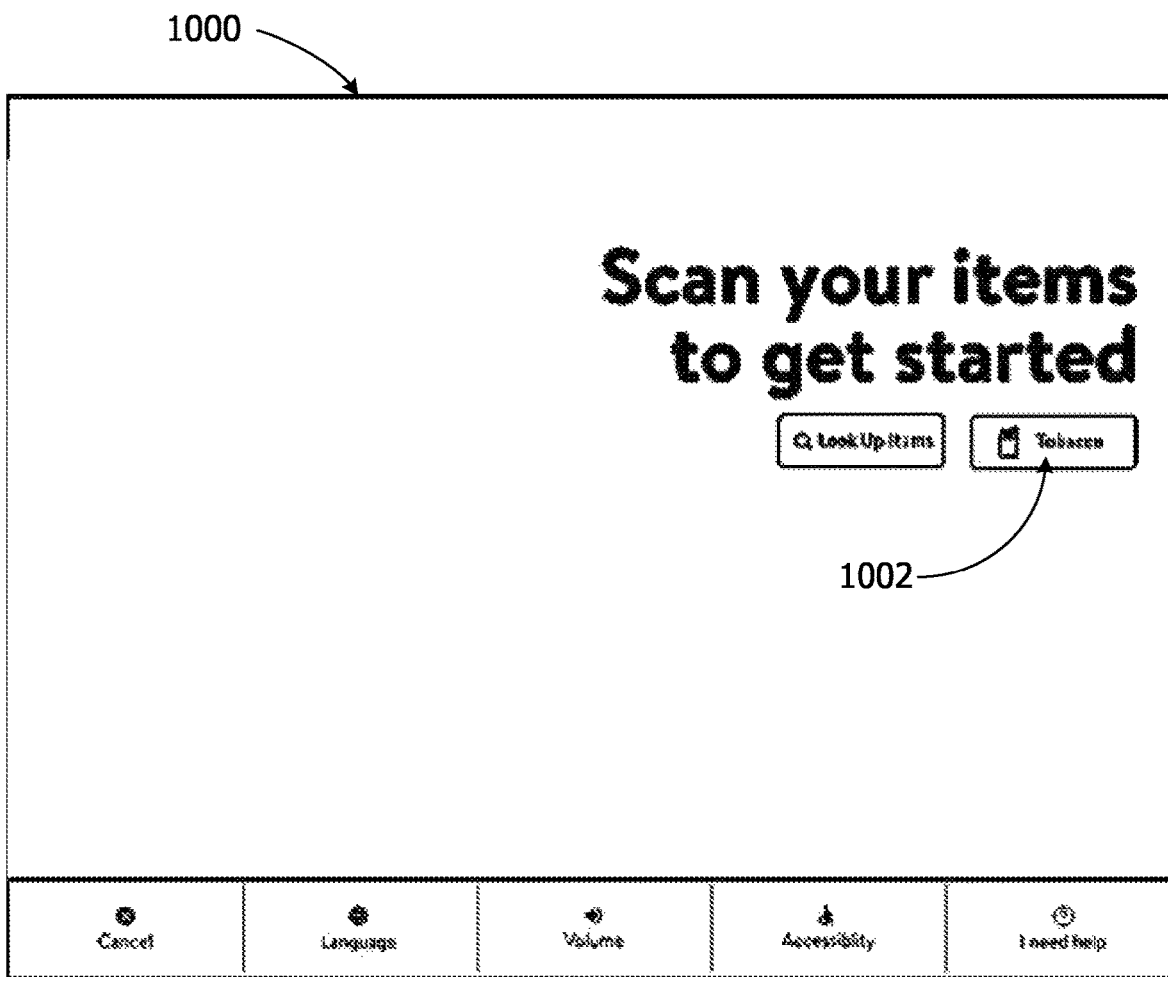
FIG. 10 is an exemplary screenshot of a GUI including a sale-restricted item selection control.

FIG. 10 is an exemplary screenshot 1000 of a GUI including a sale-restricted item selection control 1002. In this non-limiting example, the sale-restricted item selection control 1002 activates SCO process for purchasing tobacco products. In other examples, the control 1002 is an icon or menu option for purchasing other sale-restricted items, such as, but not limited to, baby formula, razers, or other items.

The control 1002 in this example is displayed on an introductory screen prior to a user scanning any items at the SCO device for purchase. In other examples, the control is displayed during scanning of items at the SCO device and/or when the user is finished scanning items and ready to complete purchase of items.

Figure 11:
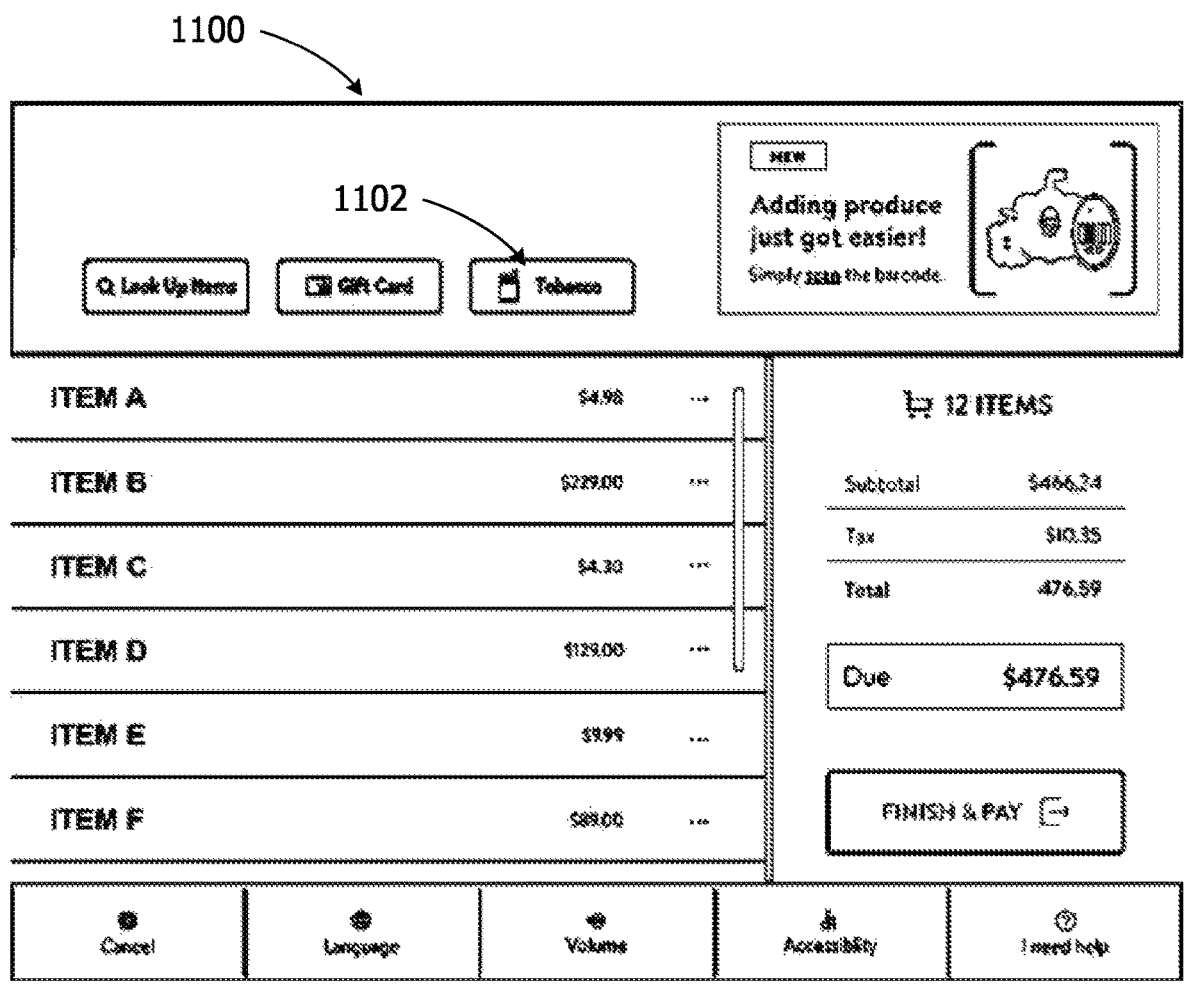
FIG. 11 is an exemplary screenshot of a GUI including a sale-restricted item selection control displayed during scanning of items at a SCO device.

FIG. 11 is an exemplary screenshot of a GUI including a sale-restricted item selection control 1102 displayed during scanning of items at a SCO device. In this non-limiting example, a user has scanned about a dozen items. The control 1102 is displayed during the scanning. This permits a user to purchase tobacco or other sale-restricted items along with other items in a customer's basket as a single transaction.

Figure 12:
FIG. 12 is an exemplary screenshot of a GUI including a customer age-verification prompt.

FIG. 12 is an exemplary screenshot 1200 of a GUI including a customer age-verification prompt 1202. The prompt 1202 includes a control 1204 for selection by the user to indicate whether the user is at least eighteen years old. In other examples, the prompt 1202 can request the user verify that the user is at least twenty-one years old.

Figure 13:
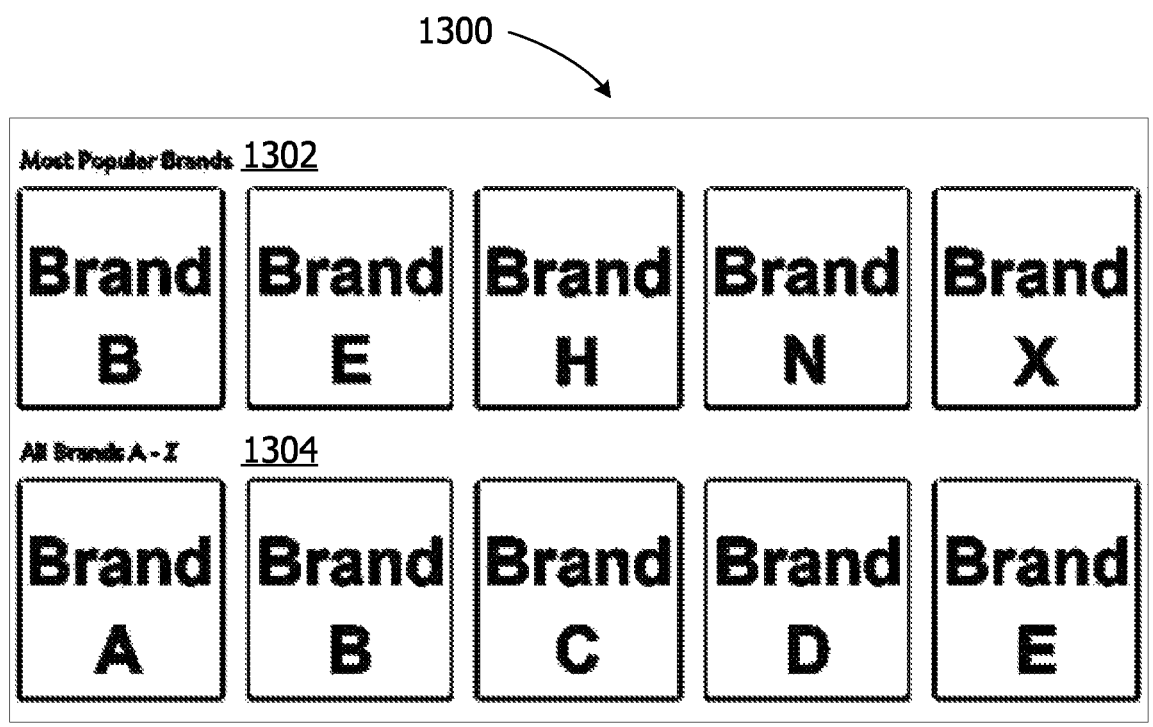
FIG. 13 is an exemplary screenshot of a GUI including a list of sale-restricted items displayed in categories.

FIG. 13 is an exemplary screenshot 1300 of a GUI including a list of sale-restricted items displayed in categories. In this non-limiting example, the items are displayed according to brand. The brands can be displayed according to most popular brands 1302 and/or all brands listed in alphabetical order at 1304. This enables the user to select a preferred brand.

Figure 14:
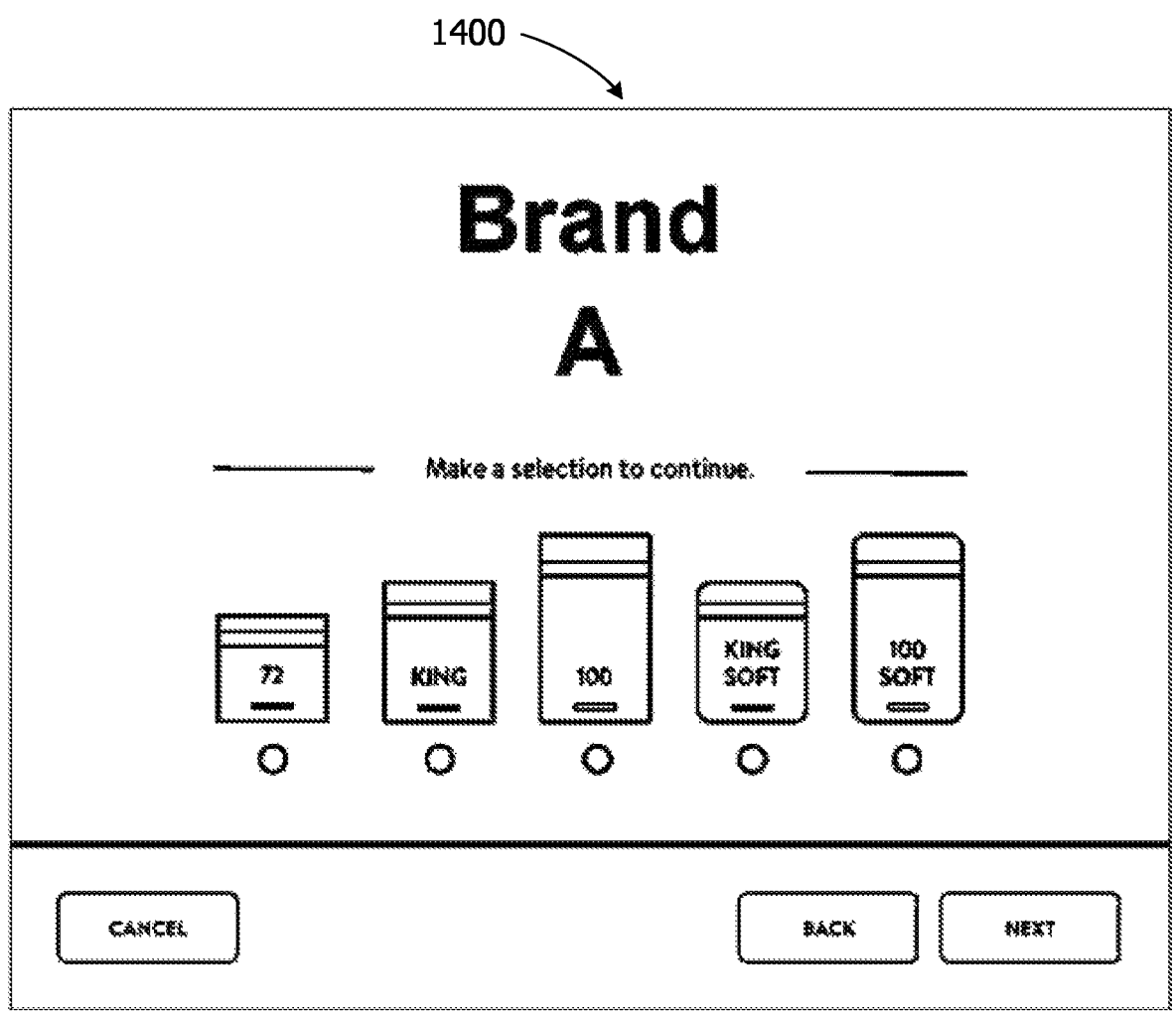
FIG. 14 is an exemplary screenshot of a GUI including a list of size options for a selected brand of an item.

FIG. 14 is an exemplary screenshot 1400 of a GUI including a list of size options for a selected brand of an item. In this example, the GUI enables the customer to select a preferred size of an item from a set of size options.

Figure 15:
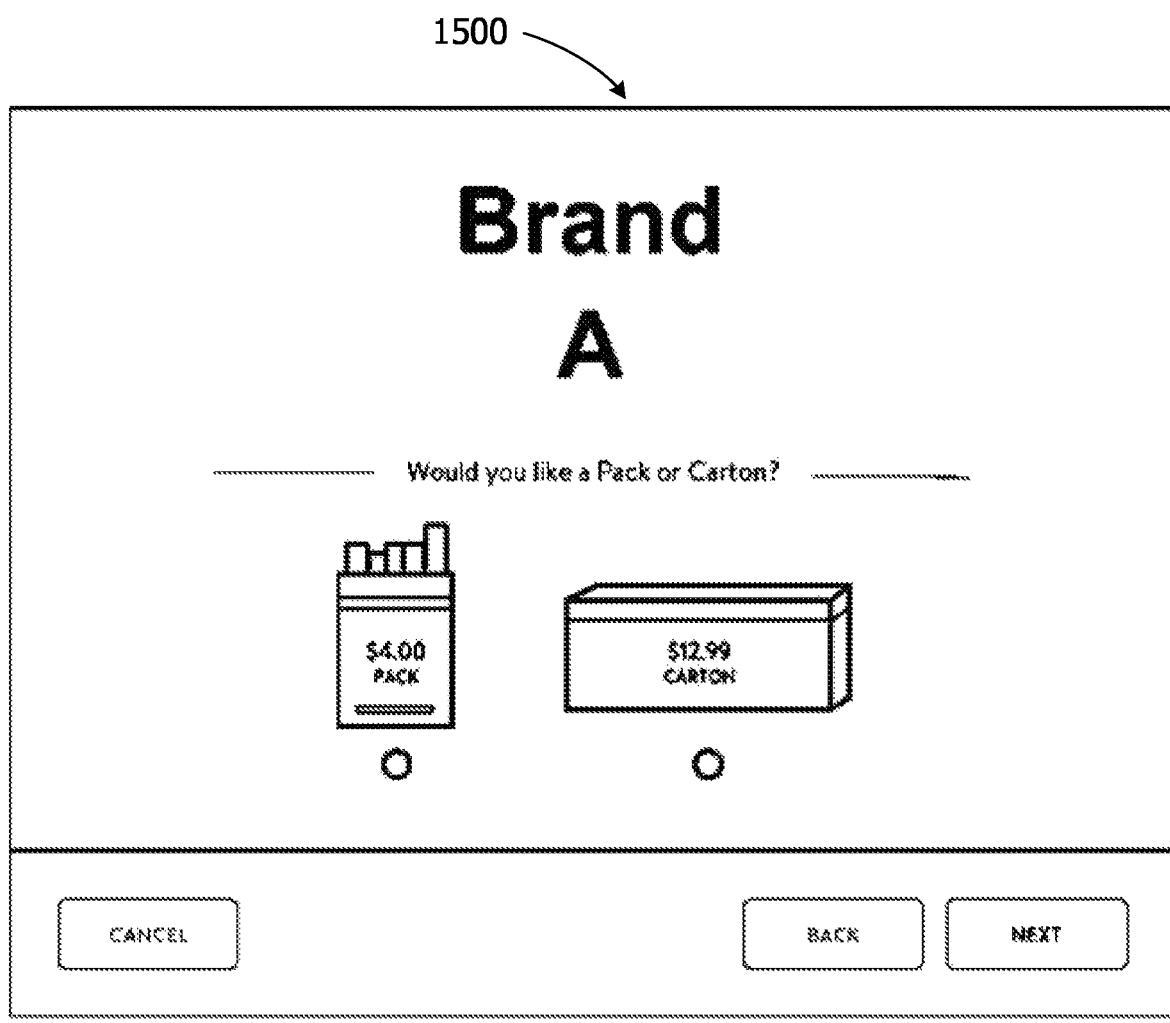
FIG. 15 is an exemplary screenshot of a GUI including a set of two possible size options for a selected item.

FIG. 15 is an exemplary screenshot 1400 of a GUI including a set of two possible size options for a selected item. In this example, the user can select a pack or carton size of an item.

Figure 16:
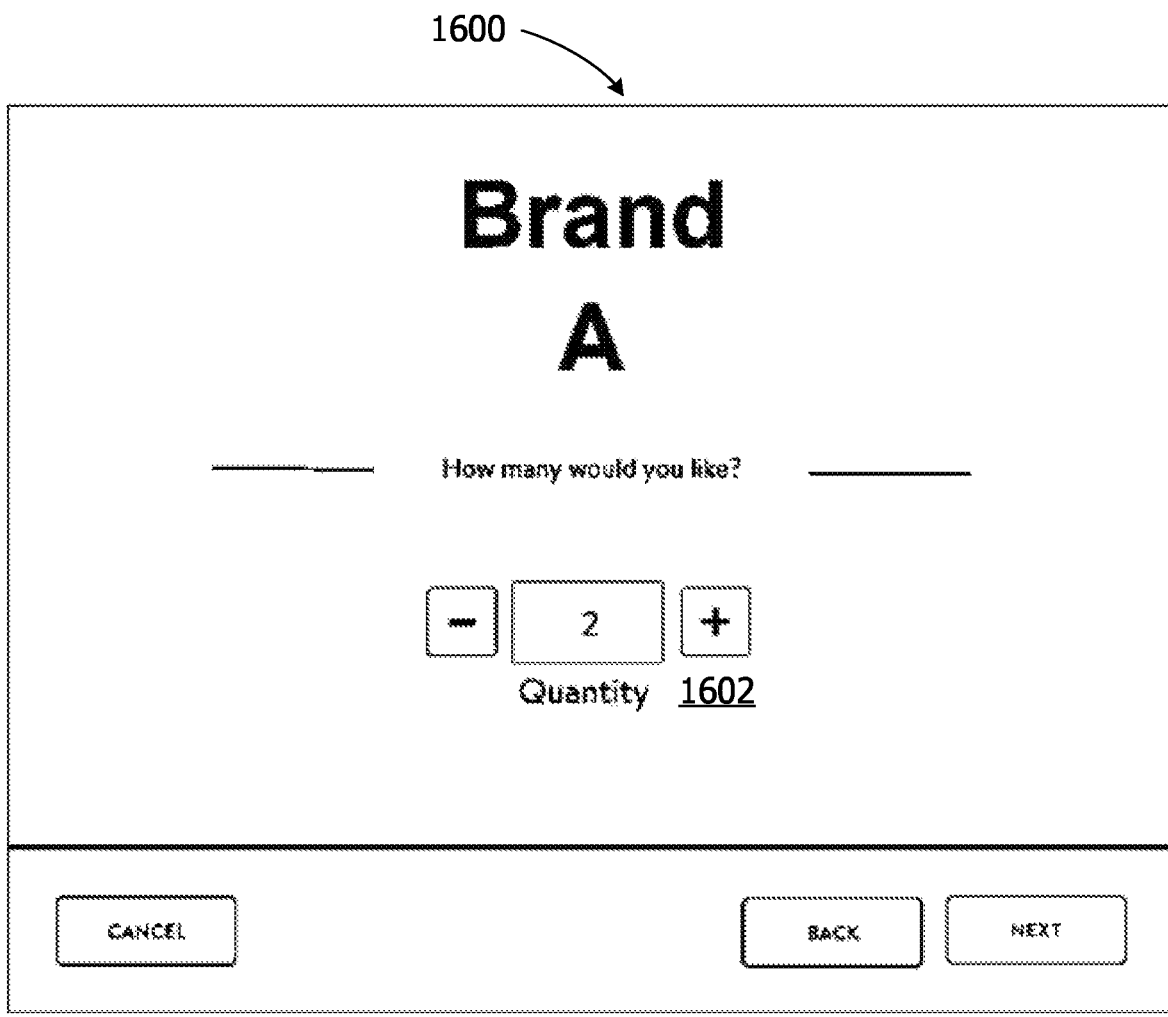
FIG. 16 is an exemplary screenshot of a GUI including a quantity selection option for selection a quantity of a selected item for purchase.

FIG. 16 is an exemplary screenshot 1600 of a GUI including a quantity selection option 1602 for selection a quantity of a selected item for purchase. In this non-limiting example, a customer has selected a quantity of two instances of a selected item. In other examples, a user can select a quantity of one, as well as a quantity of two or more.

Figure 17:
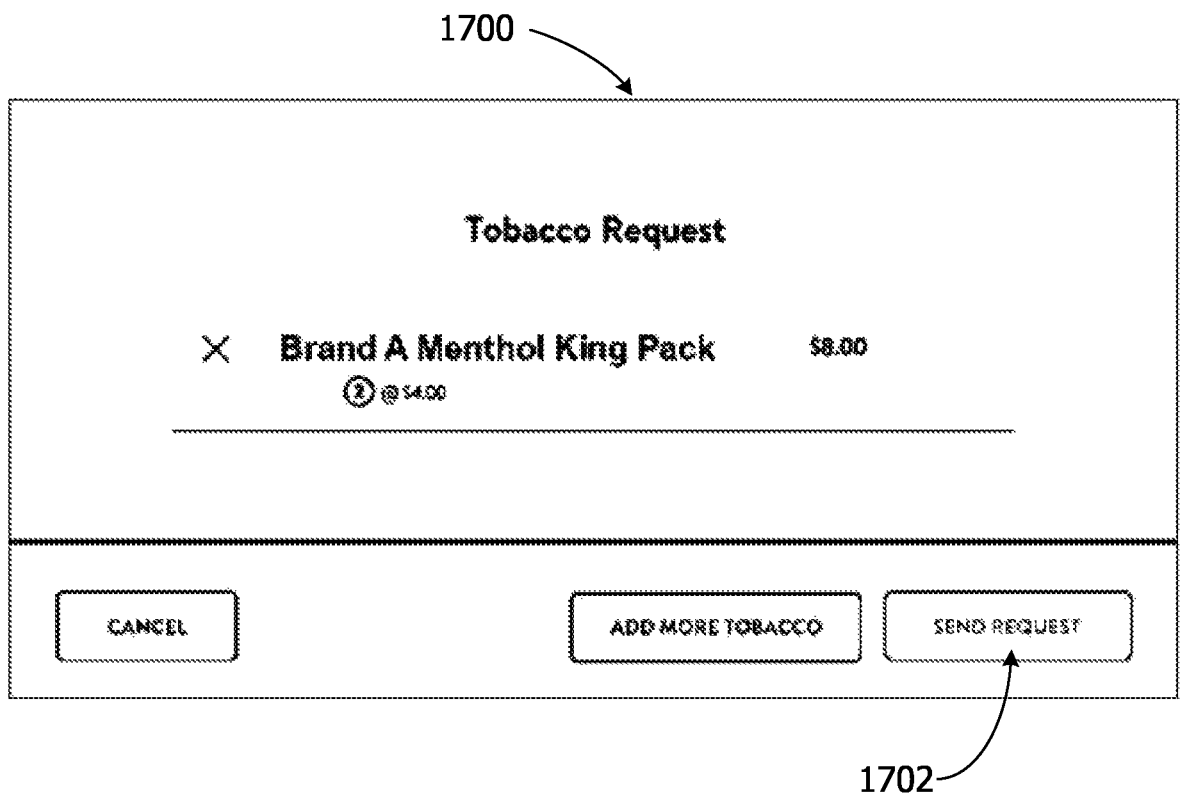
FIG. 17 is an exemplary screenshot of a GUI including a send request option for sending a sale-restricted item retrieval request to an authorized user.

FIG. 17 is an exemplary screenshot 1700 of a GUI including a send request control 1702 for sending a sale-restricted item retrieval request to an authorized user. The user selects the send request control 1702 to initiate sending the request for the selected brand, variety, type and quantity of the selected item to the authorized user.

Figure 18:
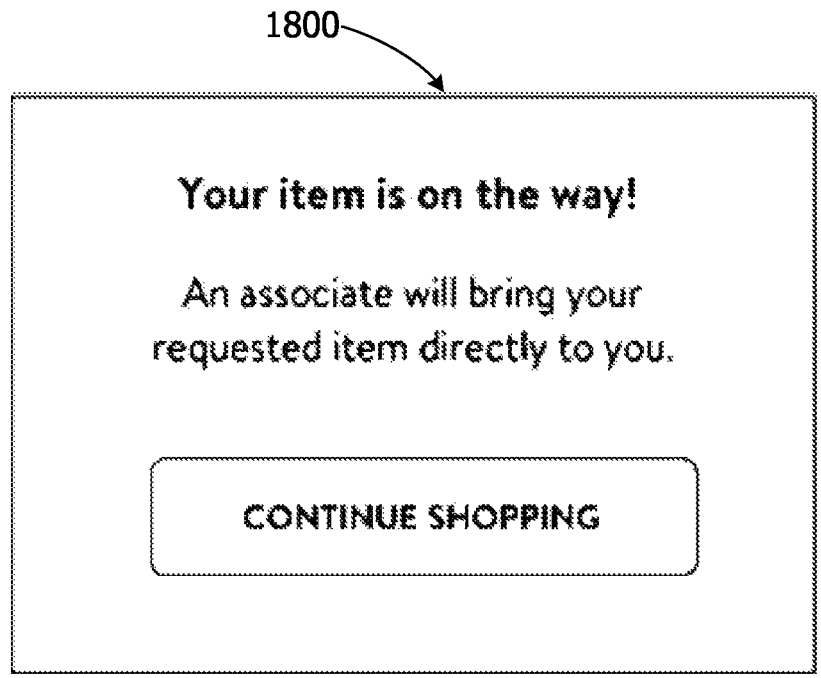
FIG. 18 is an exemplary screenshot of a GUI including a retrieval status update.

FIG. 18 is an exemplary screenshot 1800 of a GUI including a retrieval status update. In this non-limiting example, the status update includes a notification to the customer that an authorized user is retrieving the requested item(s). The user can continue shopping and/or continue scanning items while waiting for the authorized user to bring the items.

Figure 19:
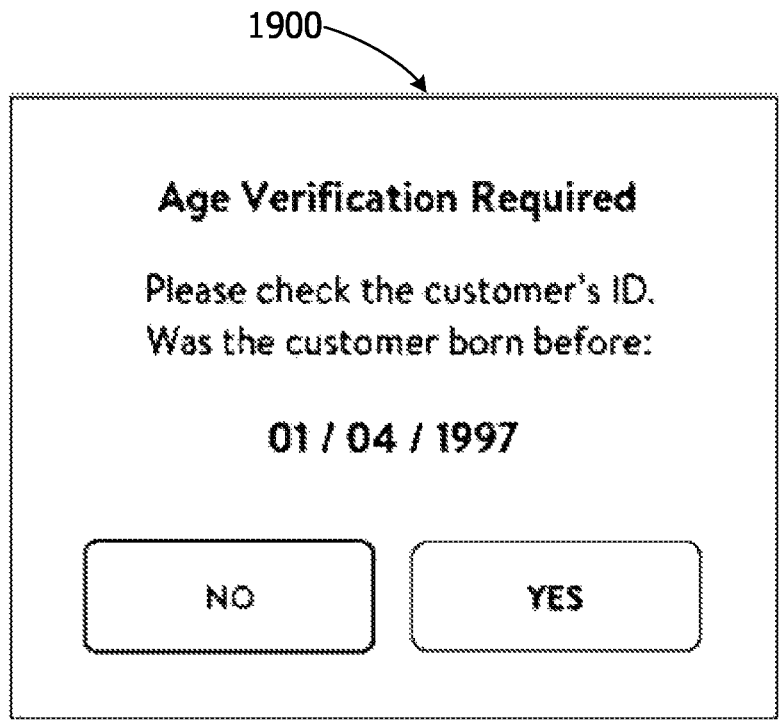
FIG. 19 is an exemplary screenshot of a GUI including an age verification request.

FIG. 19 is an exemplary screenshot 1900 of a GUI including an age verification request. In this example, the age verification request is displayed to an authorized user via a user interface on the SCO device. In other examples, the age verification request is displayed to the authorized user via a user interface on a user device associated with the user. The request prompts the authorized user to perform an age verification of the customer requesting the sale-restricted item.

Additional Examples

In some examples, the system enables a customer to select a sale-restricted item from a list of available items at a SCO device. The UI permits the user to navigate through list(s) of items and options associated with those items, such as size, variety, brand, etc.

An alert can be sent to an application on a user device associated with authorized personnel. The alert instructs the authorized personnel to retrieve the selected item and bring it to the identified SCO device (customer's location). For example, the alert can tell an associate that register 10 needs a pack of brand A cigarettes. The alert informs the authorized personnel where the product is located in a locked/secured case or other storage device. In some examples, the alert is a real-time host driven alert.

In some examples, the authorized personnel can scan the product to make sure it is the right one. While the item is being retrieved, the UI can display a status update to the customer, such as, item retrieval under way, item on the way, etc. The authorized personnel verifies the age of customer. After the customer pays, the authorized personnel hands over the product(s) to the customer.

The system enables customers to select items from a SCO device without using a manned checkout. This reduces inefficient staffing due to fluctuating demand throughout open hours. It further enables additional points of customer access to sale-restricted items rather than being limited to manned checkout stations. This further reduces checkout lines and wait times, reduces shrink and improves staffing efficiencies.

In an example scenario, a user device associated with an authorized user receives a retrieve sale-restricted item alert. Once the user device receives scan data associated with the retrieved item, the application compares the scan data with the selected item data to determine if the correct item has been retrieved for the customer. If the retrieved item is correct, the application outputs an age verification prompt to the authorized user instructing the user to verify the customer's age. If the customer's age is verified as qualifying to purchase the item, the authorized user is authorized to surrender the item to the customer and complete the transaction. The alert is cleared from the user device.

In another example scenario, a customer orders a tobacco product from a SCO device. The system sends an alert to an "upfront" user device associated with a user device. The alert includes the register number (SCO device ID), product image and location of the item in the storage device. An authorized associate (user) retrieves the selected item using an electronic key to open the unlock the storage device. The authorized associate verifies the customers age, scans the product on the SCO device and hands the product over to the customer.

Alternatively, or in addition to the other examples described herein, examples include any combination of the following:

- an analysis component, implemented on the at least one processor, analyzes scan data received from a scan device associated with the second user to verify the second user retrieved an item corresponding to the selected sale-restricted item and the set of options selected by the first user, the set of options comprising the variety and size of an item type;
- a user device associated with the second user, displays an alert notifying the second user to retrieve at least one sale-restricted item and verify an age of the first user, wherein the alert comprises the notification;
- wherein the notification comprises a location of the sale-restricted item within a storage device and a register ID associated with the first user;
- a smart storage device storing the set of sale-restricted items, wherein the notification component transmits an item ID associated with the selected sale-restricted item, and wherein the smart storage device automatically dispenses the selected sale-restricted item to the second user;
- a set of locking cabinets storing the set of sale-restricted items, wherein at least one cabinet in the set of cabinets is unlocked to obtain an instance of the selected sale-restricted item;
- the verification component, implemented on the at least one processor, outputs a prompt to the first user to obtain a verification of age from the first user;
- the verification component, implemented on the at least one processor, outputs a prompt to the second user instructing the second user to perform an age verification associated with the first user;
- an update component, implemented on the at least one processor, updates the list of sale-restricted items to generate a per-store customized list of items, wherein items are listed in an order of priority based on per-store demand for each sale-restricted item;
- analyzing, by an analysis component, scan data generated by a scan device scanning a sale-restricted item retrieved by the second user to verify the retrieved item corresponds to the selected sale-restricted item and a set of options selected by the first user, the set of options comprising the variety, quantity and size of the item;
- outputting, by a user device associated with the second user, an alert notifying the second user to retrieve at least one sale-restricted item and verify an age of the first user, wherein the alert comprises a location of the sale-restricted item within a storage device and a register ID associated with the first user;
- transmitting the notification to a smart storage device storing the set of sale-restricted items, wherein the notification comprises an item ID associated with the selected sale-restricted item, and wherein the smart storage device automatically dispenses the selected sale-restricted item to the second user;
- prompting, via the GUI, the first user to provide a verification of age from the first user;
- outputting, via the GUI, an instruction to the second user to obtain verification of age from the first user;
- updating the list of sale-restricted items to generate a per-store customized list of items, wherein items are listed in an order of priority based on per-store demand for each sale-restricted item.

At least a portion of the functionality of the various elements in FIG. 1, FIG. 2, FIG. 3, FIG. 4, FIG. 5 and FIG. 6 can be performed by other elements in FIG. 1, FIG. 2, FIG. 3, FIG. 4, FIG. 5 and FIG. 6, or an entity (e.g., processor 106, web service, server, application program, computing device, etc.) not shown in FIG. 1, FIG. 2, FIG. 3, FIG. 4, FIG. 5 and FIG. 6.

In some examples, the operations illustrated in FIG. 7, FIG. 8 and FIG. 9 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of managing sale-restricted items for hosted self-checkout, the method comprising displaying, by a control component, a sale-restricted item selection control on a GUI associated with a self-checkout (SCO) register; presenting, by a list component, a per-store customized list of sale-restricted items available for purchase via the GUI responsive to activation of the sale-restricted item selection control; sending, by a notification component, an item retrieval notification to a user device associated with a second user, the notification comprising an identification of a selected sale-restricted item and a location of the selected sale-restricted item within a sale-restricted items storage device; and authorizing, by a verification component, completion of a transaction associated with purchase of the selected sale-restricted item by the first user responsive to receiving an age verification from the second user.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for managing sale-restricted items at a SCO. For example, the elements illustrated in FIG. 1, FIG. 2, FIG. 3, FIG. 4, FIG. 5 and FIG. 6, such as when encoded to perform the operations illustrated in FIG. 7, FIG. 8 and FIG. 9, constitute exemplary means for providing a sale-restricted item selection control on a GUI associated with a self-checkout (SCO) register for activation by a first user; exemplary means for presenting a per-store customized list of sale-restricted items available for purchase via the GUI responsive to activation of the sale-restricted item selection control; exemplary means for sending an item retrieval notification to a user device associated with a second user, the notification comprising an identification of a selected sale-restricted item and a location of the selected sale-restricted item within a sale-restricted items storage device; and exemplary means for authorizing completion of a transaction associated with purchase of the selected sale-restricted item by the first user responsive to receiving an age verification from the second user.

Other non-limiting examples provide one or more computer storage devices having a first computer-executable instructions stored thereon for providing management of sale-restricted items associated with a SCO. When executed by a computer, the computer performs operations including displaying a sale-restricted item selection control on a GUI associated with a self-checkout (SCO) register for activation by a first user; outputting a per-store customized list of sale-restricted items available for purchase via the GUI responsive to activation of the sale-restricted item selection control; sending an item retrieval notification to a user device associated with a second user, the notification comprising an identification of a selected sale-restricted item and a location of the selected sale-restricted item within a sale-restricted items storage device; and authorizing completion of a transaction associated with purchase of the selected sale-restricted item by the first user responsive to receiving an age verification from the second user.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI can be discarded depending upon the degree to which such KRI has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for managing sale-restricted items for hosted self-checkout, the system comprising:
    at least one processor communicatively coupled to a memory;
    a user interface device providing a graphical user interface (GUI);
    a restricted items selection control, displayed via the GUI, the restricted items selection control including a list of sale-restricted items;
    a smart storage device communicatively connected to a network, the smart storage device storing the sale-restricted items in a lockable storage inaccessible to unauthorized users;
    a notification component, implemented on the at least one processor, that transmits a notification to a user device associated with an authorized user responsive to an unauthorized user selection of a sale-restricted item from the list of sale-restricted items displayed via the GUI, the notification including an age verification prompt associated with the transaction, an identification of the selected sale-restricted item and location of the selected sale-restricted item within the smart storage device; and
    a verification component, implemented on the at least one processor, that receives age verification from the user device associated with the authorized user and authorizes completion of the transaction associated with the selected sale-restricted item by the unauthorized user on condition the age verification complies with age requirements for the selected sale-restricted item, wherein, responsive to the authorization of the completion of the transaction, an unlocking signal is sent via the network to the smart storage device storing the selected sale-restricted item, wherein the smart storage device is unlocked to obtain the selected sale-restricted item responsive to the unlocking signal received based on the authorization of the completion of the transaction.

2. The system of claim 1, further comprising:
    an analysis component, implemented on the at least one processor, that analyzes scan data received from the user device associated with the authorized user to verify the authorized user retrieved the selected sale-restricted item selected by the unauthorized user.

3. The system of claim 1, wherein the age verification prompt of the notification further comprises a request to verify an age of the unauthorized user associated with the selected sale-restricted item.

4. The system of claim 1, wherein the notification further comprises a register ID associated with the unauthorized user.

5. The system of claim 1, wherein the smart storage device automatically dispenses the selected sale-restricted item to the unauthorized user in response to receiving the unlocking signal.

6. The system of claim 5, wherein the unlocking signal includes an item ID associated with the selected sale-restricted item.

7. The system of claim 1, wherein the smart storage device includes an electronic lock, and wherein the unlocking signal is an electronic key.

8. The system of claim 1, wherein the smart storage device includes an electronic lock, and wherein the electronic lock is controlled via a signal from the user device of the authorized user.

9. The system of claim 1, further comprising:
    an update component, implemented on the at least one processor, that updates the list of sale-restricted items to generate a per-store customized list of sale-restricted items,
    wherein the sale-restricted items are listed in an order of priority based on per-store demand for each sale-restricted item.

10. A computer-implemented method for managing sale-restricted items for hosted self-checkout, the method comprising:
    displaying, via a graphical user interface (GUI), a list of sale-restricted items, the sale-restricted items stored in a smart storage device in lockable storage inaccessible to unauthorized users;
    receiving, via the GUI, a selection of a sale-restricted item from the list of sale-restricted items, the selection associated with an unauthorized user;
    responsive to receiving the selection of the sale-restricted item, sending a notification to a user device associated with an authorized user, the notification including an age verification prompt corresponding to the selected sale-restricted item associated with the unauthorized user, an identification of the selected sale-restricted item and a location of the selected sale-restricted item within the smart storage device;
    responsive to receiving, from the user device associated with the authorized user, age verification for the unauthorized user, authorizing completion of the transaction corresponding to the selected sale-restricted item; and
    responsive to the authorized completion of the transaction, sending an unlocking signal to the smart storage device storing the selected sale-restricted item, wherein the smart storage device is unlocked to obtain the selected sale-restricted item responsive to receiving the unlocking signal based on the authorization of the completion of the transaction.

11. The computer-implemented method of claim 10, further comprising:
analyzing scan data received from the user device associated with the authorized user to verify a retrieved item corresponds to the selected sale-restricted item selected by the unauthorized user.

12. The computer-implemented method of claim 10, wherein the notification includes a register ID associated with the unauthorized user.

13. The computer-implemented method of claim 10, wherein the smart storage device automatically dispenses the selected sale-restricted item to the unauthorized user in response to receiving the unlocking signal.

14. The computer-implemented method of claim 13, wherein the unlocking signal includes an item ID associated with the selected sale-restricted item.

15. The computer-implemented method of claim 10, wherein the smart storage device includes an electronic lock, and wherein the unlocking signal is an electronic key.

16. The computer-implemented method of claim 10, wherein the smart storage device includes an electronic lock, and wherein the electronic lock is controlled via a signal from the user device of the authorized user.

17. One or more computer storage devices, having computer-executable instructions for managing sale-restricted items that upon execution by a computer cause the computer to perform operations comprising:
displaying, via a graphical user interface (GUI), a list of sale-restricted items;
receiving, via the GUI, a selection of a sale-restricted item from the list of sale-restricted items, the selection associated with an unauthorized user;
responsive to receiving the selection of the sale-restricted item, sending a notification to a user device associated with an authorized user, the notification including an age verification prompt corresponding to the selected sale-restricted item associated with the unauthorized user, an identification of the selected sale-restricted item and a location of the selected sale-restricted item within a smart storage device, the smart storage device storing the sale-restricted items in lockable storage inaccessible to unauthorized users;
receiving age verification for the unauthorized user from the user device associated with the authorized user:
responsive to receiving the age verification for the unauthorized user, authorizing completion of the transaction corresponding to the selected sale-restricted item; and
responsive to the authorized completion of the transaction, sending an unlocking signal to the smart storage device, wherein the smart storage device is unlocked to obtain the selected sale-restricted item responsive to receiving the unlocking signal based on the authorization of the completion of the transaction.

18. The one or more computer storage devices of claim 17, wherein the smart storage device automatically dispenses the selected sale-restricted item to the unauthorized user in response to receiving the unlocking signal.

19. The one or more computer storage devices of claim 17, wherein the unlocking signal comprises an item ID associated with the selected sale-restricted item.

20. The one or more computer storage devices of claim 17, wherein the smart storage device includes an electronic lock, and wherein the electronic lock is controlled via a signal from the user device of the authorized user.

* * * * *